(12) United States Patent
Wang et al.

(10) Patent No.: US 12,620,260 B2
(45) Date of Patent: May 5, 2026

(54) INFORMATION PROCESSING METHOD, COMPUTER DEVICE, AND STORAGE MEDIUM

(71) Applicant: MaShang Consumer Finance Co., Ltd., Chongqing (CN)

(72) Inventors: Chun Wang, Chongqing (CN); Dingheng Zeng, Chongqing (CN); Xunyi Zhou, Chongqing (CN); Ning Jiang, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 314 days.

(21) Appl. No.: 18/396,971

(22) Filed: Dec. 27, 2023

(65) Prior Publication Data

US 2024/0135747 A1 Apr. 25, 2024

Related U.S. Application Data

(63) Continuation-in-part of application No. PCT/CN2022/144220, filed on Dec. 30, 2022.

(30) Foreign Application Priority Data

Apr. 8, 2022 (CN) .......................... 202210369409.5

(51) Int. Cl.
*G06K 9/00* (2022.01)
*G06T 17/00* (2006.01)
(Continued)

(52) U.S. Cl.
CPC ............ *G06V 40/168* (2022.01); *G06T 17/00* (2013.01); *G06V 10/54* (2022.01); *G06V 40/174* (2022.01)

(58) Field of Classification Search
CPC .... G06V 40/168; G06V 10/54; G06V 40/174; G06V 10/60; G06V 10/82; G06T 17/00; G06T 7/50; G06T 13/40
See application file for complete search history.

(56) References Cited

U.S. PATENT DOCUMENTS

| | | | |
|---|---|---|---|
| 8,249,310 B2 * | 8/2012 | Okubo | G06V 40/165 |
| | | | 382/206 |
| 10,783,352 B2 * | 9/2020 | Huang | G06V 40/176 |

(Continued)

FOREIGN PATENT DOCUMENTS

| | | | | |
|---|---|---|---|---|
| CN | 111523413 A | * | 8/2020 | G06N 3/045 |
| CN | 112036356 A | * | 12/2020 | G06V 40/161 |

(Continued)

OTHER PUBLICATIONS

Monocular 3D Facial Expression Features for Continuous Affect Recognition, Ercheng Pei et al., IEEE, 2021, pp. 3540-3550 ( Year: 2021).*

(Continued)

*Primary Examiner* — Jayesh A Patel
(74) *Attorney, Agent, or Firm* — PV IP PC; Wei Te Chung

(57) ABSTRACT

An information processing method is provided. The method includes obtaining a target video. A first target image feature corresponding to a face image of each frame is obtained. A target identity coefficient and a target texture coefficient corresponding to the target image feature in the face image of a different frame in the target video are obtained. A first target identity feature is obtained according to the target identity coefficient, and a first target texture feature is obtained according to the target texture coefficient. Once a first target feature is obtained by splicing the target image feature, the first target identity feature and the first target (Continued)

texture feature, a first target expression coefficient is obtained based on the first target feature.

20 Claims, 8 Drawing Sheets

(51) Int. Cl.
G06V 10/54 (2022.01)
G06V 40/16 (2022.01)

(56) References Cited

U.S. PATENT DOCUMENTS

| 11,222,466 | B1 * | 1/2022 | Naruniec | G06N 3/0455 |
|---|---|---|---|---|
| 11,276,231 | B2 * | 3/2022 | Chandran | G06V 10/754 |
| 11,321,960 | B2 * | 5/2022 | Zhou | G06V 40/166 |
| 11,380,050 | B2 * | 7/2022 | Zhe | G06N 3/047 |
| 11,645,798 | B1 * | 5/2023 | Demyanov | G06V 40/176 |
| | | | | 345/474 |
| 11,686,105 | B2 * | 6/2023 | Beyreuther | E04F 15/046 |
| | | | | 52/588.1 |
| 11,869,150 | B1 * | 1/2024 | Mason | G06N 3/0464 |
| 11,941,753 | B2 * | 3/2024 | Zhou | G06T 7/75 |
| 12,243,349 | B2 * | 3/2025 | Bradley | G06V 40/176 |
| 12,266,042 | B2 * | 4/2025 | Kimura | G06V 40/176 |
| 2007/0189627 | A1 * | 8/2007 | Cohen | G06V 40/161 |
| | | | | 382/254 |
| 2018/0068178 | A1 * | 3/2018 | Theobalt | G06T 13/40 |
| 2019/0138794 | A1 * | 5/2019 | Huang | G06F 21/32 |
| 2019/0147642 | A1 * | 5/2019 | Cole | G06V 20/64 |
| | | | | 345/419 |
| 2021/0192192 | A1 * | 6/2021 | Li | G06N 3/02 |
| 2021/0350508 | A1 * | 11/2021 | Li | G06V 40/174 |
| 2021/0357625 | A1 * | 11/2021 | Song | G06T 17/00 |
| 2021/0386383 | A1 * | 12/2021 | McDuff | G06T 5/94 |
| 2021/0406568 | A1 * | 12/2021 | Liberman | G06N 3/09 |
| 2022/0129689 | A1 * | 4/2022 | Kim | G06N 3/0455 |
| 2022/0301348 | A1 * | 9/2022 | Bradley | G06T 17/20 |
| 2023/0081982 | A1 * | 3/2023 | He | G06V 10/751 |
| | | | | 382/157 |
| 2023/0326248 | A1 * | 10/2023 | He | G06V 10/778 |
| | | | | 382/157 |
| 2024/0037852 | A1 * | 2/2024 | Zhang | G06T 13/40 |

FOREIGN PATENT DOCUMENTS

| CN | 112884881 | | 6/2021 | |
|---|---|---|---|---|
| CN | 112884881 | A * | 6/2021 | G06V 40/161 |
| CN | 113838173 | | 12/2021 | |
| CN | 113838173 | A * | 12/2021 | G10L 21/0272 |
| CN | 113887529 | | 1/2022 | |
| CN | 114241558 | | 3/2022 | |
| CN | 114241558 | A * | 3/2022 | G06F 18/214 |
| CN | 114782864 | | 7/2022 | |
| CN | 114783022 | | 7/2022 | |
| CN | 114821404 | | 7/2022 | |
| CN | 114898244 | | 8/2022 | |

OTHER PUBLICATIONS

High Quality Facial Surface and Texture Synthesis via Generative Adversarial Networks, Ron Slossberg et al., ECCV, 2018, pp. 1-18 (Year: 2018).*
Face Texture Generation and Identity-Preserving Rectification, Stefan Hormann et al., IEEE, 2021, pp. 2448-2452 (Year: 2021).*
Full Face-and-Head 3D Model With Photorealistic Texture, Yangyu Fan et al., IEEE, 2020, pp. 210709-210721 (Year: 2020).*
Simultaneous Facial Feature Tracking and Facial Expression Recognition, Yongqiang Li et al., IEEE, 2013, pp. 2559-2573 (Year : 2013).*
Ercheng Pei et al: "Monocular 3D Facial Expression Features for Continuous Affect Recognition", IEEE Transactions on Multimedia, IEEE, USA, vol. 23, Sep. 25, 2020, pp. 3540-3550, XP011883722, ISSN: 1520-9210,DOI: 10.1109/TMM. 2020.3026894.

* cited by examiner

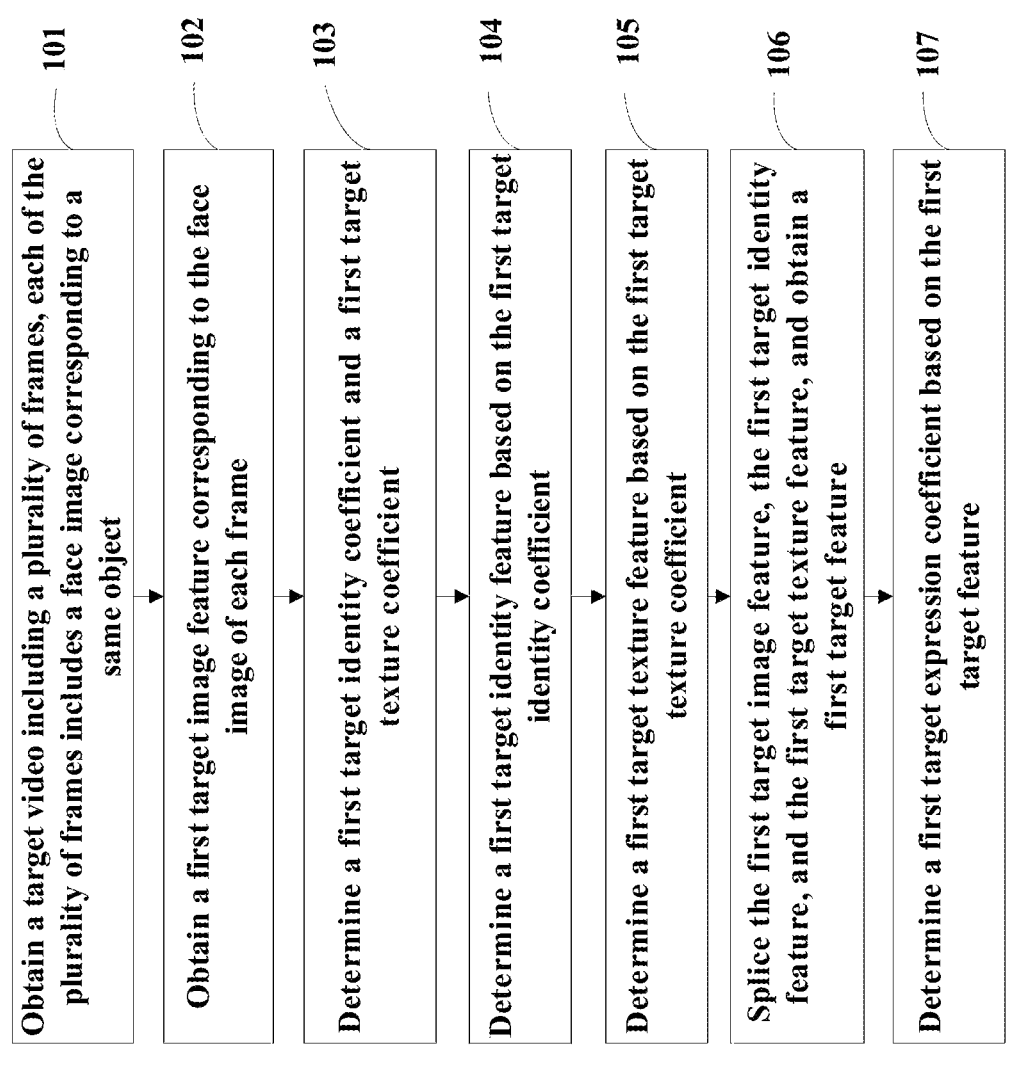

Obtain a target video including a plurality of frames, each of the plurality of frames includes a face image corresponding to a same object — 101

Obtain a first target image feature corresponding to the face image of each frame — 102

Determine a first target identity coefficient and a first target texture coefficient — 103

Determine a first target identity feature based on the first target identity coefficient — 104

Determine a first target texture feature based on the first target texture coefficient — 105

Splice the first target image feature, the first target identity feature, and the first target texture feature, and obtain a first target feature — 106

Determine a first target expression coefficient based on the first target feature — 107

FIG. 2

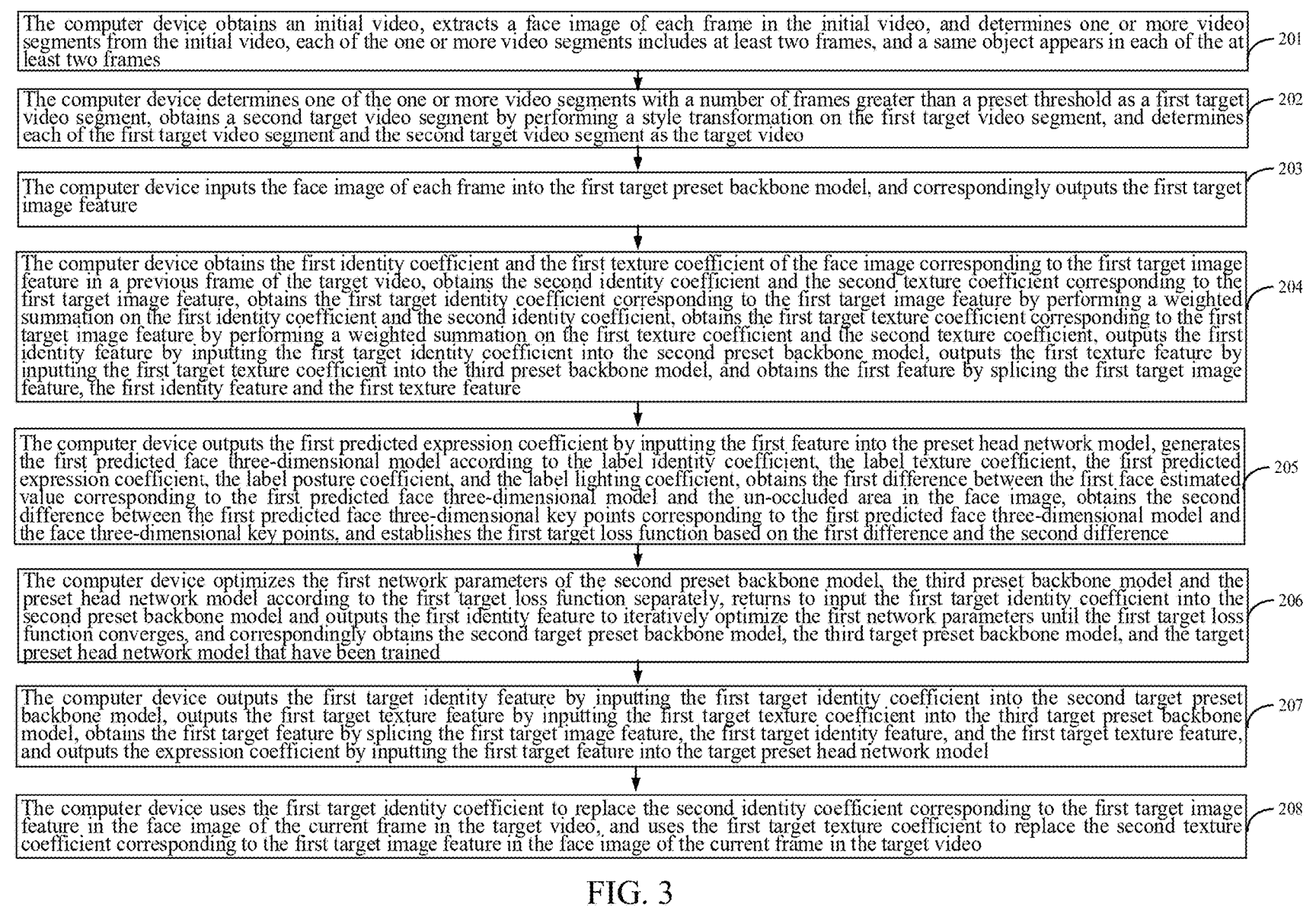

201 — The computer device obtains an initial video, extracts a face image of each frame in the initial video, and determines one or more video segments from the initial video, each of the one or more video segments includes at least two frames, and a same object appears in each of the at least two frames 202 — The computer device determines one of the one or more video segments with a number of frames greater than a preset threshold as a first target video segment, obtains a second target video segment by performing a style transformation on the first target video segment, and determines each of the first target video segment and the second target video segment as the target video 203 — The computer device inputs the face image of each frame into the first target preset backbone model, and correspondingly outputs the first target image feature 204 — The computer device obtains the first identity coefficient and the first texture coefficient of the face image corresponding to the first target image feature in a previous frame of the target video, obtains the second identity coefficient and the second texture coefficient corresponding to the first target image feature, obtains the first target identity coefficient and the second identity coefficient corresponding to the first target image feature by performing a weighted summation on the first identity coefficient and the second identity coefficient corresponding to the first target image feature by performing a weighted summation on the first target identity coefficient and the second identity coefficient, outputs the first identity feature by inputting the first target identity coefficient into the second preset backbone model, outputs the first texture feature by inputting the first target texture coefficient into the third preset backbone model, and obtains the first target image feature, the first identity feature and the first texture feature 205 — The computer device outputs the first predicted expression coefficient by inputting the first feature into the preset head network model, generates the first predicted face three-dimensional model according to the label identity coefficient, the label texture coefficient, the first predicted expression coefficient, the label posture coefficient, and the label lighting coefficient, obtains the first difference between the first face estimated value corresponding to the first predicted face three-dimensional model and the un-occluded area in the face image, obtains the second difference between the first predicted face three-dimensional key points corresponding to the first predicted face three-dimensional model and the face three-dimensional key points, and establishes the first target loss function based on the first difference and the second difference 206 — The computer device optimizes the first network parameters of the second preset backbone model, the third preset backbone model and the preset head network model according to the first target loss function separately, returns to input the first target identity coefficient into the second preset backbone model and outputs the first identity feature to iteratively optimize the first network parameters until the first target loss function converges, and correspondingly obtains the second target preset backbone model, the third target preset backbone model, and the target preset head network model that have been trained 207 — The computer device outputs the first target identity feature by inputting the first target identity coefficient into the second target preset backbone model, outputs the first target texture feature by inputting the first target texture coefficient into the third target preset backbone model, obtains the first target image feature by splicing the first target image feature, the first target identity feature, and the first target texture feature, and outputs the expression coefficient by inputting the first target feature into the target preset head network model 208 — The computer device uses the first target identity coefficient corresponding to replace the second identity coefficient corresponding to the first target image feature in the face image of the current frame in the target video, and uses the first target texture coefficient to replace the second texture coefficient corresponding to the first target image feature in the face image of the current frame in the target video

FIG. 3

INFORMATION PROCESSING METHOD, COMPUTER DEVICE, AND STORAGE MEDIUM

The present application claims the priority to Chinese patent application with application No. 202210369409.5, filed on Apr. 8, 2022, entitled "INFORMATION PROCESS-ING METHOD, DEVICE, COMPUTER DEVICE, AND STORAGE MEDIUM", the content of the present applica-tion is incorporated herein by reference.

FIELD

The present application relates to the field of computer vision technology, and specifically to an information pro-cessing method, a device, a computer device, and a storage medium.

BACKGROUND

Face reconstruction is a popular field in computer vision. Reconstructing a face 3D model based on face images is one of fundamental technologies for many face-related applica-tions.

In some cases, the face 3D model is constructed through a parameterized face 3D reconstruction algorithm. The parameterized face 3D reconstruction algorithm takes a parametric face 3D model to acquire prior information as constrains. A problem to reconstruction the face 3D is transformed into an estimation of parameters of a param-eterized face 3D model, which can well cope with the reconstruction of face 3D model in different environments. Moreover, commonly used e parameterized face 3D recon-struction algorithms often do reconstruction by estimating 3DMM (3D Morphable Model) coefficients.

BRIEF DESCRIPTION OF THE DRAWINGS

In order to more clearly illustrate the technical solutions in the embodiments of the present application, the drawings needed to be used in the description of the embodiments will be briefly introduced below. Obviously, the drawings in the following description are only some embodiments of the present application. For those skilled in the art, other draw-ings can also be obtained based on these drawings without exerting creative efforts.

FIG. 2 is a schematic diagram of a flowchart of an information processing method provided by an embodiment of the present application;

FIG. 3 is a schematic diagram of another flowchart of the information processing method provided by an embodiment of the present application;

DESCRIPTION

The technical solutions in the embodiments of the present application will be clearly and completely described below with reference to the accompanying drawings in the embodi-ments of the present application. Obviously, the described embodiments are only some of the embodiments of the present application, rather than all of the embodiments. Based on the embodiments in this application, all other embodiments obtained by those skilled in the art without making creative efforts fall within the scope of protection of this application.

In order to implement subsequent operations such as determination of speakers or editing of expressions, it is often necessary to extract expression information of human face in an image. However, 3DMM expression information directly extracted by an image-based parameterized face 3D reconstruction algorithm commonly used mixes with other non-expression information, which results the expression information that is extracted inaccurate and result a poor accuracy of information processing.

In order to solve the above problem, the present applica-tion provides an information processing method, an infor-mation processing device, a computer device, and a storage medium. Among them, the information processing method can be applied to the information processing device. The information processing device may be integrated in the computer device, and the computer device may be a terminal having an information processing function. The terminal can be, but is not limited to a smart phone, a tablet computer, a notebook computer, a desktop computer, and a smart watch, etc. The computer device can also be a server, and the server can be an independent physical server, or a server cluster or a distributed system composed of a plurality of physical servers, or can also be a cloud server that provides basic cloud computing services. The basic cloud computing ser-vices include cloud services, cloud databases, cloud com-puting, cloud functions, cloud storage, network services, cloud communications, middleware services, domain name services, security services, a content delivery network (CDN), big data and artificial intelligence platforms, etc.

Figure 1:
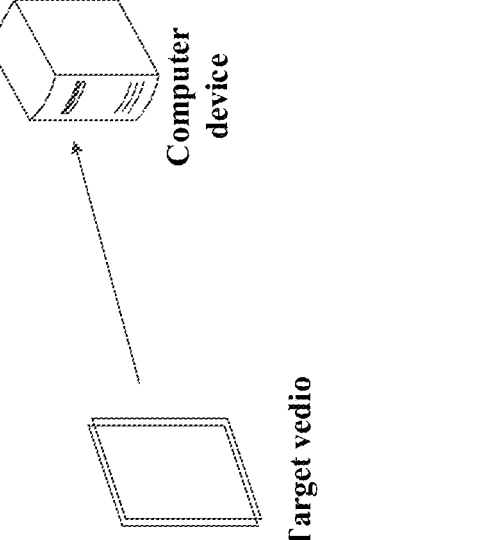
FIG. 1 is a schematic diagram of a scene of an information processing system provided by an embodiment of the pres-ent application.

Please refer to FIG. 1, which is a schematic diagram of a scene of an information processing system provided by the present application; as shown in the figure, the computer device obtains a target video, each frame of the target video includes a face image corresponding to a same object; inputs the face image of each frame into a first target preset backbone model, and correspondingly outputs a first target image feature; determines a first target identity coefficient and a first target texture coefficient, the first target identity coefficient is an identity coefficient of the face image cor-responding to the first target image feature in a different frame of the target video, the first target texture coefficient is a texture coefficient of the face image corresponding to the first target image feature in the different frame of the target video, the first target identity coefficient and the first target texture coefficient are taken from the face image of a same frame; inputs the first target identity coefficient into a second target preset backbone model and outputs a first target identity feature; inputs the first target texture coefficient into a third target preset backbone model and outputs a first target texture feature; splices the first target image feature, the first target identity feature, and the first target texture feature, and obtains a first target feature; inputs the first target feature into a target preset head network model, and outputs a first target expression coefficient, among them, the target preset head network model is obtained by performing a prediction optimization training combining a prior identity coefficient and a prior texture coefficient corresponding to the face image of a different frame in the target video.

It should be noted that the schematic diagram of the scene of the information processing system shown in FIG. 1 is only an example. The scene of the information processing system described in the embodiment of the present application is to explain a technical solution of the present application more clearly and does not constitute a limitation of the technical solution provided by the present application. The ordinary skilled in the art knows that the technical solution provided by the present application is also applicable to similar technical problems with an evolution of processing information and an emergence of new business scenarios.

Detailed descriptions are provided below.

In this embodiment, descriptions will be made from a perspective of an information processing device. The information processing device may be integrated in a computer device with a storage device and a processor installed to have computing capabilities.

Please refer to FIG. 2, which is a schematic diagram of a flowchart of an information processing method provided by an embodiment of the present application. This information processing method can be applied to a computer device (such as the computer device shown in FIG. 6). According to different requirements, the order of the blocks in the flowchart can be changed, and some blocks can be omitted. This information processing method includes following blocks.

In block 101, obtaining a target video.

Among them, the target video includes a plurality of frames, and each of the plurality of frames includes a face image corresponding to a same object. The same object can be a user, i.e., the embodiment of the present application can determine a video segment in which face images of a same user continuously appears as the target video.

In some embodiments, obtaining the target video may include:

(1) Obtaining an initial video;

(2) Extracting the face image of each frame in the initial video;

(3) Determining the same object by analyzing the face image of each frame, and determining one or more video segments from the initial video, each of the one or more video segments includes at least two frames and the same object appears in each of the at least two frames;

(4) Determining one of the one or more video segments with a number of frames greater than a preset threshold as the target video.

Among them, the initial video may be a video includes one or more human faces that are clear. In this way, a face frame corresponding to each human face in each frame can be determined sequentially through a face detection algorithm and a face tracking algorithm, and the face frame can be labelled in a form of a rectangular box.

Furthermore, each face frame of the same object in the video can be associated to form a face frame sequence. A rule of establishing the face frame sequence is shown in following:

Compare a similarity of face frames in adjacent positions of adjacent frames with a preset threshold. If the similarity is greater than the preset threshold, the face frames in adjacent positions of adjacent frames are identified to be corresponding to the same object. From a second frame in the video, if there is no object that is the same as an object in a previous frame, then the comparing of face frames is ended, and if there is a frame includes an object that is not same as the object in the previous frame, then creates a new face frame sequence, such that at least one face frame sequence corresponding to a same object can be determined.

In order to ensure a quality of the face frame sequence, in one embodiment, the face frames in the face frame sequence can be filtered through the following method: (A) a face frame in the face frame sequence that overlaps with at least one face frame in another face frame sequence can be deleted; (B) a face frame with a size less than a preset size in the face frame sequence can be deleted; (C) a face frame with a blurred face image in the face frame sequence can be deleted. A method for determining the blurred face image can be based on calculating a Laplacian value of an image within the face frame. If the Laplacian value is less than a preset threshold, the blurred face image is determined. In this way, each same object corresponds to one face frame sequence, the face frame sequence of which a length is less than a preset number of frames is discarded. For example, a face frame sequence whose length is less than 10 frames is deleted.

In order to ensure an image quality of the face frame, the face frame sequence is smoothed to form a face frame subsequence of which each face frame is a square frame, specifically includes (D) generating a frame center sequence by calculating a center (hereinafter referred to as "frame center") of each face frame in the face frame subsequence and generating a frame side length sequence by calculating a side length (the larger of a length and a width, and is magnified 1.4 times) of each face frame in the face frame subsequence; (E) performing a smoothing filtering on the frame center sequence and the frame side length sequence; (F) obtaining a smoothed face frame sequence by reorganizing face frames according to frame centers and side lengths that have been smoothed. In this way, according to the smoothed face frame sequence, images at corresponding positions are cropped from the corresponding frames in the initial video (if a square frame exceeds an image boundary, fill it with 0 pixel), scaled to a predetermined size, and at least one target video is generated by splicing the images that have been scaled according to an order of the corresponding frames, and each of the at least one target video includes face images corresponding to the same object.

In some embodiments, determining one of the one or more video segments with the number of frames greater than the preset threshold as the target video may include:

(1.1) Determining the one of the one or more video segments with the number of frames greater than the preset threshold as a first target video segment;

(1.2) Obtaining a second target video segment by performing a style transformation on the first target video segment; and (1.3) Determining each of the first target video segment and the second target video segment as the target video.

Among them, the video segment with the number of frames greater than the preset threshold can be determined as the first target video segment. In order to adapt to more application scenarios, a data augmentation can be performed on the first target video segment. In one embodiment, the second target video segment, i.e., the augmented video segment can be obtained by performing a style transformation on the first target video segment, and the style transformation refers to operations that do not change the image size, such as compression, brightness change, hue change and/or changing encoding format. As each of the first target video segment and the second target video segment is determined as the target video, that is, augmentation of the target video is achieved.

The multiplied videos can also be further multiplied through the above method. In some embodiments, in order to ensure the quality of the target video, the multiplied video is not further multiplied.

In some embodiments, the face detection algorithm can be used to extract the face image of each frame in the target video and scale the face image of each frame to a predetermined size. This article chooses to scale the face image of each frame to a size of 224*224*3, which is consistent with a size of an input image of a first preset backbone network; and further extract face three-dimensional (3D) key points in the face image. The face 3D key points determine an expression form of a human face. The target video can be converted into a collection of {a face image, face 3D key points}. It should be noted that when some of the multiplied video is not clear, the corresponding face 3D key points may not be accurately extracted. In order to solve the above problem, the face 3D key points of an original target video corresponding to the multiplied video can be used as face 3D key points corresponding to the multiplied video that cannot extract face 3D key points.

In block 102, obtaining a first target image feature corresponding to the face image of each frame.

In one embodiment, the computer device can input the face image of each frame into a first target preset backbone model, and correspondingly output a first target image feature.

Among them, the first target preset backbone model is used to extract a common feature of the face image of each frame. The first preset backbone model can use a 4-layer ResBlock network structure as a backbone network. With this, the face image of each frame can be input into the first target preset backbone model and a correspondingly first target image feature is output. A scale of the first target image feature may be 28*28*128.

The first target preset backbone model is obtained by training a first preset backbone model. Network parameters of the first preset backbone model can be initialized to pre-trained network parameters of ImageNet. Specifically, in order to better understand the embodiments of the present application, here we first explain the principle of training the first preset backbone model:

In related technologies, a face 3D model can usually be constructed through a parametric face 3D reconstruction algorithm. It should be noted that the 3DMM is a parametric face 3D model, which mainly consist of two vectors including a vector of geometry (which can also be understood as shape) and a vector of texture, that is, any new face can be generated by a combination of these vectors, which are expressed by the following formulas:

$$S(\alpha_{id}, \alpha_{exp}) = \overline{S} + B_{id} * \alpha_{id} + B_{exp} * \alpha_{exp}$$

$$T(\beta_{tex}) = \overline{T} + B_{tex} * \beta_{tex}$$

Among them, S represents a face 3D geometry, $\overline{S}$ represents an average face 3D geometry of 3DMM which is a known parameter, $B_{id}$ and $B_{exp}$ respectively represent a base representing identity and a base representing expression in 3DMM, which are configured as known parameters, $\alpha_{id}$ and $\alpha_{exp}$ respectively represent corresponding identity coefficient and expression coefficient.

By setting different identity coefficients and expression coefficients, different face 3D geometric shapes can be obtained. Similarly, T represents the face texture, $\beta_{tex}$ represents the corresponding texture coefficient, T represents an average face texture of 3DMM, which is a known parameter, $B_{tex}$ represents a base of texture in 3DMM, which is a preconfigured known parameter, by setting different texture coefficients, different face textures can be obtained.

In particular, in order to project the face 3D model into an image, it is also necessary to know a posture coefficient of the face 3D model relative to a camera, as well as a lighting coefficient of an ambient light lighting model. In this way, as long as the identity coefficient, the texture coefficient, the expression coefficient, the posture coefficient and the lighting coefficient are known, a face 3D model can be generated according to needs.

In the embodiment of the present application, in order to improve tasks like active speaker detection and expression recognition, it is necessary to extract the expression coefficient separately. In one embodiment, the expression coefficient defined by 3DMM can be used as a required expression coefficient. For example, under 3DMM, a human face without an expression is defined as a neutral expression, and the neutral expression can be understood as a naturally relaxed face, eyes looking straight ahead, a mouth naturally closed and corners of the mouth flat. A deformation of the face 3D model of a same person under another expression with the neutral expression as a relative reference is the expression. Correspondingly, expression information corresponding to the expression is the expression coefficient that needs to be extracted in the embodiment of the present application. The more accurate the expression coefficient that is extracted is, the better the subsequent processing based on the expression coefficient will be. For example, a determination of a speaker based on the expression coefficient will be more accurate.

However, estimating coefficients is a nonlinear algorithm problem. When only one face image is taken as an input, there are often a plurality of local solutions. That is, there are a plurality of combinations of <identity coefficient, texture coefficient, expression coefficient, posture coefficient, lighting coefficient> that can form a similar face 3D model. For example, a face image with thick lips and a relatively small mouth may correspond to a 3D facial model of a person with the thick lips and the relatively small mouth under the neutral expression, or may correspond to a face 3D model of a person with thin lips and a relatively large mouth with a slightly pouting expression, both of which can achieve similar fitting to the image that is input.

In view of this situation where the plurality of local solutions exists, it is often caused by a coupling of the expression coefficient and other non-expression coefficients, especially the identity coefficient. However, in order to realize a decoupling of the expression coefficient and other non-expression coefficients, the embodiment of the present application presets the identity coefficient and the texture coefficient of the face image corresponding to the same object in each frame of the target video. Since a time interval is short, these face images should have the same identity coefficient and the same texture coefficient, that is, a shared identity coefficient and a shared texture coefficient used by the target video for the same object can be set. The shared identity coefficient can be pre-stored in a shared identity coefficient set, and the shared texture coefficient can be pre-stored in a shared texture coefficient set. The shared identity coefficient set can have a dimension of K*80, where K represents a number of sets participating in training in a database, and 80 represents a dimension of the shared identity coefficient of the 3DMM used in this article. Specifically, one shared identity coefficient can be expressed as an 80-dimensional vector, and the shared identity coefficient set can include K shared identity coefficients, and the K shared identity coefficients together form a K*80-dimensional matrix. The shared identity coefficient can be initialized to Gaussian noise with a mean of 0 and a variance of 0.1, that is, the shared identity coefficient can be intelligently updated along with a process of training a model.

The shared texture coefficient can be pre-stored in the shared texture coefficient set. The shared texture coefficient set can be K*80 in dimension. K represents a number of sets participating in training in the database. The 80 represents the dimension of the shared texture coefficient of the 3DMM used in this article. Specifically, one shared texture coefficient can be represented as an 80-dimensional vector, and the shared texture coefficient set can include K shared texture coefficients, and the K shared texture coefficients together form a K*80-dimensional matrix. The shared texture coefficient can be initialized to Gaussian noise with a mean of 0 and a variance of 0.1, that is, the shared texture coefficient can be intelligently updated along with a process of training a model.

In some embodiments, processes of prediction and optimization training of the first preset backbone model, a first preset network model, a second preset network model, a third preset network model, the shared identity coefficient and the shared texture coefficient are shown as follows:

Block 1, generating a second target loss function, in one embodiment, the generating of the second target loss function includes:

(1) Correspondingly outputting a first image feature by inputting the face image of each frame into the first preset backbone model;

(2) Correspondingly outputting an intermediate predicted expression coefficient, a first predicted posture coefficient and a first predicted lighting coefficient by inputting the first image feature into the first preset network model, the second preset network model, and the third preset network model separately;

(3) Obtaining the shared identity coefficient and the shared texture coefficient corresponding to the face image of the same object in the target video;

(4) Generating an intermediate predicted face 3D model based on the shared identity coefficient, the shared texture coefficient, the intermediate predicted expression coefficient, the first predicted posture coefficient and the first predicted lighting coefficient;

(5) Obtaining a third difference between an intermediate face estimated value corresponding to the intermediate predicted face 3D model and a face image on the un-occluded area of the face image corresponding to the first image feature that is input;

(6) Obtaining a fourth difference between intermediate predicted face 3D key points corresponding to the intermediate predicted face 3D model and face 3D key points in the face image corresponding to the first image feature that is input;

(7) Establishing a constraint relationship between the shared identity coefficient, the shared texture coefficient and the intermediate predicted expression coefficient through a regularization loss function;

(8) Generating a corresponding second target loss function based on the third difference, the fourth difference, and the constraint relationship;

Block 2, training according to the second target loss function. In one embodiment, a training process is as follows:

Performing an iterative optimization on second network parameters of the first preset backbone model, the first preset network model, the second preset network model, the third preset network model, the shared identity coefficient, and the shared texture coefficient according to the second target loss function, until the second target loss function converges, and obtaining the first target preset backbone model, a first target preset network model, a second target preset network model, a third target preset network model, and the shared identity coefficient and the shared texture coefficient that have been trained.

Among them, the first preset backbone model is used to predict the common feature of the face image of each frame, the first preset network model is used to predict the expression coefficient, the second preset network model is used to predict the posture coefficient, and the third preset network model is used to predict the lighting coefficient. The shared identity coefficient is used to represent the identity coefficient of a target object in the target video, and the shared texture coefficient is used to represent the texture coefficient of the target object in the target video. For the same target object in the target video, the shared identity coefficient corresponding to the face image of each frame is the same, and the shared texture coefficient corresponding to the face image of each frame is the same, so as to introduce additional constraint relationship on the identity coefficient and the texture coefficient to resolve ambiguity.

The first preset network model, the second preset network model, and the third preset network model can have similar structures, that is, they can adopt a 4-layer ResBlock structure and use a fully connected layer (FC layer) structure at the end. Based on this, each first image feature can be input into the first preset network model, the second preset network model and the third preset network model separately, and the intermediate predicted expression coefficient, the first predicted posture coefficient and the first predicted lighting coefficient that are predicted can be output correspondingly. Since the first preset network model, the second preset network model, and the third preset network model have not completed training yet, the intermediate predicted expression coefficient, the first predicted posture coefficient and the first predicted lighting coefficient are not optimal values.

In the related technology, since there is no "true value of coefficient" as a label for recursive training, it is impossible to directly measure whether the intermediate predicted expression coefficient, the first predicted posture coefficient, and the first predicted lighting coefficient that are predicted are good or bad. In order to solve the above problem, the embodiment of the present application can adopt an indirect measurement method, that is, the shared identity coefficient and the shared texture coefficient corresponding to the face image of the same object in the target video can be first obtained, and then based on the shared identity coefficient, the shared texture coefficient, and the intermediate predicted expression coefficient, the first predicted posture coefficient and the first predicted lighting coefficient, generate the intermediate predicted face 3D model (including the face 3D geometry and the face texture).

Further, the intermediate face estimated value is a 2-dimensional image obtained by rendering a current estimated value (geometry, texture) of the constructed intermediate predicted face three-dimensional model through a differentiable renderer.

The third difference between the intermediate face estimated value corresponding to the intermediate predicted face 3D model and the un-occluded area in the corresponding face image (i.e., the original image) can be determined. The greater the third difference is, the less closer the intermediate face estimated value is to the face image, and correspondingly, it indicates that the first image feature, the intermediate predicted expression coefficient, the first predicted posture coefficient, the first predicted lighting coefficient, the shared identity coefficient, and the shared texture coefficient are less accurate, on the contrary, the smaller the third difference is, it indicates that the intermediate face estimated value is closer to the face image, and correspondingly, it indicates that the first image feature, the intermediate predicted expression coefficient, the first predicted posture coefficient, and the first predicted lighting coefficient, the shared identity coefficient, and the shared texture coefficient are more accurate. The third difference can be calculated by the following formula:

$$L_{rec} = \frac{\sum_{i \in M} M_i \| I_i - \hat{I}_i \|}{\sum_{i \in M} M_i}$$

Among them, $L_{rec}$ represents the third difference, $M_i$ represents the unoccluded area, $I_i$ represents the i-th face image, and $\hat{I}_i$ represents the i-th intermediate face estimated value. The third difference is calculated through the above formula. The above formula can be understood as a loss function of the third difference.

When determining the third difference corresponding to the intermediate predicted face 3D model, the reason why the un-occluded area M is introduced is that the 3DMM model cannot express an occlusion, resulting in that all the "face image estimated values constructed by the coefficient estimated values" are complete faces. If the "truth value of the face image" is not a complete face, such as wearing sunglasses, a difference between the two should not be compared at an occluded part, so we choose to use M to remove the occluded part and only compare the un-occluded part of the face. Therefore, during training, some common occlusions can be attached to the face image online based on the face 3D key points of the face image. For example, an image of sunglasses is scaled and attached to the human eyes according to a scale of key points of the human eyes, resulting in augmentation at image levels such as partial occlusion of the face image, and enhancing a robustness of the deep neural network to face occlusion.

It is also possible to obtain the fourth difference between the intermediate predicted face three-dimensional key points corresponding to the intermediate predicted face three-dimensional model and the face three-dimensional key points of a real face image. Specifically, vertices of semantic positions of the face 3D key points used in the intermediate predicted face 3D model can be projected onto the image to obtain the current estimated value $\hat{k}$ of the face 3D key points (intermediate predicted face 3D key points), calculate the fourth difference between the current estimated value $\hat{k}$ and a true value K of the face three-dimensional key points of the real face image in the un-occluded area M. The larger the fourth difference is, the less closer the predicted intermediate face three-dimensional key points are to the real face three-dimensional key points, and correspondingly, it means that the first preset backbone model, the intermediate predicted expression coefficient, the first predicted posture coefficient, the first predicted lighting coefficient, the shared identity coefficient and the shared texture coefficient are less accurate; on the contrary, the smaller the fourth difference is, the closer the predicted intermediate face three-dimensional key points are to real face three-dimensional key points, and correspondingly, it means that the first preset backbone model, the intermediate predicted expression coefficient, the first predicted posture coefficient, the first predicted lighting coefficient, the shared identity coefficient and the shared texture coefficient are more accurate. The fourth difference can be calculated by the following formula:

$$L_{lan} = \frac{\sum_{i \in M} w_i \| k_i - \hat{k}_i \|}{N}$$

Among them, $L_{lan}$ represents the fourth difference, and $w_i$ represents a weight. Each key point has a different weight, that is, when calculating the loss function, errors of some key points are more important than errors of other key points. The values of these weights are predefined in technical implementation. $k_i$ represents a true value of the i-th face 3D key point, and $\hat{k}_i$ represents the current estimated value of the i-th face 3D key point of the intermediate predicted face 3D model. N represents a number of face 3D key points, for example, 68. The fourth difference is calculated through the above formula, which can be understood as the loss function of the fourth difference.

A constraint relationship between the shared identity coefficient, the shared texture coefficient, and the intermediate predicted expression coefficient can also be established through a regularization loss function to constrain the constraint relationship between the shared identity coefficient, the shared texture coefficient and the first predicted expression coefficient not to deviate too much from the mean of zero, it can be calculated by the following formula:

$$L_{reg} = \alpha_d \| \hat{d} \| + \alpha_t \| \hat{t} \| + \alpha_e \| \hat{e} \|$$

Among them, $\alpha_d$, $\alpha_t$, and $\alpha_e$ represent preset weight coefficients used to balance various loss functions, $\hat{d}$ represents the shared identity coefficient, $\hat{t}$ represents the shared texture coefficient and $\hat{e}$ represents the intermediate predicted expression coefficient. The above formula can be understood as a constrained loss function.

A corresponding second target loss function can be generated according to the third difference, the fourth difference, and the constraint relationship.

Finally, the iterative optimization is performed on the second network parameters of the first preset backbone model, the first preset network model, the second preset network model, the third preset network model, the shared identity coefficient, and the shared texture coefficient according to the second target loss function, until the second target loss function converges, and the first target preset backbone model, first target preset network model, the second target preset network model, the third target preset network model, the shared identity coefficient, and the shared texture coefficient that have been trained are obtained correspondingly. That is, the second network parameters of the first preset backbone model, the first preset network model, the second preset network model, the third preset network model, the shared identity coefficient, and the shared texture coefficient can be optimized using a stochastic gradient descent algorithm according to the second target loss function, and repeatedly performing a process of generating the second target loss function for multiple times, through the second target loss function that is constantly updated, the second network parameters of the first preset backbone model, the first preset network model, the second preset network model, the third preset network model, the shared identity coefficient, and the shared texture coefficient are iteratively optimized until the second target loss function converges, that is, the loss function converges. Specifically, the second target loss function of the third difference, the fourth difference, and the constraint relationship can be established through the following formula, as follows:

$$L = \lambda_{rec}L_{rec} + \lambda_{lan}L_{lan} + \lambda_{reg}L_{reg}$$

$\lambda_{rec}$, $\lambda_{lan}$, and $\lambda_{reg}$ represent preset weight coefficients used to balance various loss functions, L represents the second target loss function. Based on the second target loss function, the second network parameters of the first preset backbone model, the first preset network model, the second preset network model, the third preset network model, the shared identity coefficient, and the shared texture coefficient are optimized according to the stochastic gradient descent algorithm, and repeatedly input each of the face images of different frames into the first preset backbone model, and output the first image features, iteratively calculate a second target loss and perform an iterative adjustment until the second target loss converges, and obtain the trained second target loss function that is converged, and obtain the first target preset backbone model, the first target preset network model, the second target preset network model, the third target preset network model, the shared identity coefficient, and the shared texture coefficient that have been trained.

In this way, the first target backbone model that has been trained can output accurate first target image feature based on the face image. The first target preset network model, the second target preset network model, and the third target preset network model that have been trained can respectively output accurate expression coefficient, accurate posture coefficient, and accurate lighting coefficient.

The network model corresponding to the second network parameters mentioned above includes an E-Net sub-model, a shared identity coefficient set sub-model and a shared texture coefficient set sub-model. Among them, the E-Net sub-model may include the first preset backbone model, the first preset network model, the second preset network model and the third preset network model that are mentioned above, the input thereof may be the face image, and the corresponding output may be the first predicted expression coefficient, the first predicted posture coefficient, and the first predicted lighting coefficient that are mentioned above. The input of the shared identity coefficient set sub-model is a sequence number k, and the output is the predicted shared identity coefficient. The input of the shared texture coefficient set sub-model is the sequence number k, and the output is the predicted shared texture coefficient. Among them, the sequence number k that is input is used to select which one of the shared identity coefficient set that is initialized/the shared texture coefficient set that is initialized is extracted to participate in a current round of training of a first network model. Put the shared identity coefficient/the shared texture coefficient updated by training back into a corresponding set, and update the shared identity coefficient set/the shared texture coefficient set. Other shared identity coefficients/other shared texture coefficients that are not selected do not participate in this round of training of the first network model, and corresponding values in the shared identity coefficient set/the shared texture coefficient set remain unchanged. In one embodiment, batch sampling is used for training, that is, in each round of training, a plurality of {face image, sequence number k corresponding to the face image} participate in the above process at the same time. Therefore, in each round of training, there are a plurality of shared identity coefficients within the shared identity coefficient set/a plurality of shared texture coefficients within the shared texture coefficient set are updated. A value distribution of the identity coefficient and the texture coefficient conforms to multi-dimensional Gaussian distribution, and its value range is between [−0.1, 0.1]. Therefore, Gaussian noise with a mean of 0 and a variance of 0.1 can be selected for initializing the shared identity coefficient in the shared identity coefficient set/the shared texture coefficient in the shared texture coefficient set. The network model is trained based on the above training process, that is, according to the second target loss function, the second network parameters are iteratively optimized for the E-Net sub-model, the shared identity coefficient set sub-model and the shared texture coefficient set sub-model until the second target loss function converges, and the E-Net sub-model, the shared identity coefficient set sub-model, and the shared texture coefficient set sub-model that have trained are obtained.

In some embodiments, the first target image feature can be input into the trained first target preset network model to output accurate target expression coefficient. The first target image feature can be input into the trained second target preset network model to output accurate target posture coefficient. The first target image feature can be input into the trained third target preset network model to output accurate target lighting coefficient. Since the additional constraint of the shared identity coefficient and the shared texture coefficient is introduced, that is, the identity coefficient and the texture coefficient are well defined, the decoupling of the target expression coefficient and other non-expression coefficients is achieved, and the accuracy of the target expression coefficient is improved.

Among them, because for the face image not in a training set, only the expression coefficient, the posture coefficient, and the lighting coefficient can be predicted, and for the face image not in the training set, the corresponding identity coefficient cannot be found in the shared identity coefficient set and the corresponding texture coefficient cannot be found in the shared texture coefficient set. A first target identity coefficient output through a fourth target preset network model that has been trained and a first target texture coefficient output through a fifth target preset network model that has been trained can complement an ability of the first target preset network model and enable the first target preset network model to predict the identity coefficient and the texture coefficient.

The fourth target preset network model and the fifth target preset network model are respectively obtained by performing a corresponding prediction optimization training of the identity coefficient and texture coefficient after the first target expression coefficient, the first target posture coefficient, and the first target lighting coefficient are determined. The fourth preset network model before training is used to predict the identity coefficient, and the fifth preset network model is used to predict the texture coefficient. The fourth preset network model and the fifth preset network model can have a similar structure, that is, they can adopt a 4-layer ResBlock structure and a fully connected layer (FC layer) structure at the end, based on this, the first target image feature can be input into the fourth preset network model and the fifth preset network model separately, and respectively output the first predicted identity coefficient and the first predicted texture coefficient that are predicted. Since the fourth preset network model and the fifth preset network model have not finished training yet, the first predicted identity coefficient and the first predicted texture coefficient are not optimal value, so the fourth preset network model and the fifth preset network model need to be trained.

In some embodiments, the process of prediction optimization training of the fourth preset network model and the fifth preset network model is as follows:

Block 1, generating a third target loss function. In one embodiment, the generating of the third target loss function includes:

(1) Inputting the first target image feature into the fourth preset network model and the fifth preset network model separately, and correspondingly outputting the first predicted identity coefficient and the first predicted texture coefficient;

(2) Establishing a fifth difference based on a difference between the first predicted identity coefficient and a label identity coefficient and a difference between the first predicted texture coefficient and a label texture coefficient;

(3) Determining predicted geometric information and predicted texture information of a second predicted face three-dimensional model based on the first predicted identity coefficient, the first predicted texture coefficient, the intermediate target expression coefficient, the first target posture coefficient and the first target lighting coefficient;

(4) Establishing a sixth difference based on a difference between the predicted geometry information and label geometry information and a difference between the predicted texture information and label texture information;

(5) Establishing the third target loss function based on the fifth difference and the sixth difference;

Block 2, performing a training based on the third target loss function. In one embodiment, a training process is as follows:

Performing an iterative optimization on third network parameters of the fourth preset network model and the fifth preset network model through the third target loss function until the third target loss function converges, such that the fourth target preset network model and the fifth target preset network model that have been trained are obtained.

Among them, the first target image feature can be input into the fourth preset network model and output the first predicted identity coefficient, the first target image feature can be input into the fifth preset network model and output the first predicted texture coefficient. Since the fourth preset network model and the fifth preset network model have not finished training yet, therefore, the first predicted identity coefficient and the first predicted texture coefficient are not optimal values.

The shared identity coefficient that has been trained can be used as the label identity coefficient and the shared texture coefficient that has been trained can be used as the label texture coefficient. However, in order to further improve a prediction accuracy of the fourth preset network model and the fifth preset network model, the embodiment of the present application can generate the second predicted face 3D model (including face 3D geometry and face texture) according to the first predicted identity coefficient, the first predicted texture coefficient, the intermediate target expression coefficient, the first target posture coefficient, and the first target lighting coefficient.

Further, the fifth difference can be established based on the difference between the first predicted identity coefficient and the label identity coefficient and the difference between the first predicted texture coefficient and the label texture coefficient. The greater the fifth difference is, the less closer the first predicted identity coefficient is to the real label identity coefficient and the less closer the first predicted texture coefficient is to the real label texture coefficient, correspondingly, it indicates that the first predicted identity coefficient and the first predicted texture coefficient are less accurate, on the contrary, the smaller the fifth difference is, it indicates that the first predicted identity coefficient is closer to the real label identity coefficient and the first predicted texture coefficient is closer to the real label texture coefficient, correspondingly, it indicates that the first predicted identity coefficient and the first predicted texture coefficient are more accurate. The fifth difference can be calculated by the following formula:

$$L_{params}=\beta_d\|\hat{d}-d_{gt}\|+\beta_t\|\hat{t}-t_{gt}\|$$

Among them, $L_{params}$ represents the fifth difference, $\beta_d$ and $\beta_t$ represent preset weight coefficients, $\hat{d}$ represents the first predicted identity coefficient, $d_{gt}$ represents the label identity coefficient, $\hat{t}$ represents the first predicted texture coefficient, $t_{gt}$ represents the label texture coefficient, and the fifth difference can be calculated by the above formula.

The predicted geometric information and the predicted texture information of the second predicted face three-dimensional model can also be determined. The predicted geometric information and the predicted texture information are not optimal values, so it is necessary to establish the sixth difference based on the difference between the predicted geometric information and the real label geometric information and the difference between the predicted texture information and the real label texture information. The greater the sixth difference is, it indicates that the less closer the predicted geometric information is to the real label geometry information and the less closer the first predicted texture coefficient is to the real label texture coefficient, correspondingly, it is indicates that the first predicted identity coefficient and the first predicted texture coefficient are less accurate, on the contrary, the smaller the sixth difference is, it indicates that the closer the predicted geometric information is to the real label geometry information and the closer the first predicted texture coefficient is to the real label texture coefficient, correspondingly, it means that the first predicted identity coefficient and the first predicted texture coefficient are more accurate. The sixth difference can be calculated by the following formula:

$$L_{3d}=\beta_{geo}\|\hat{S}-S_{gt}\|+\beta_{tex}\|\hat{T}-T_{gt}\|$$

Among them, $L_{3d}$ represents the sixth difference, $\beta_{geo}$ and $\beta_{tex}$ represent preset weight coefficients, $S_{gt}$ represents the label geometry information, $\hat{S}$ represents the prediction geometry information, $T_{gt}$ represents the label texture information, and represents the prediction texture information. The sixth difference is calculated using the above formula. And the third target loss function is established based on the fifth difference and the sixth difference.

Finally, the third network parameters of the fourth preset network model and the fifth preset network model are iteratively optimized according to the third target loss function until the third target loss function converges, and the fourth target preset network model and the fifth target preset network model that have been trained are obtained. That is, the fourth preset network model and the fifth preset network model can be optimized using the stochastic gradient descent algorithm according to the third target loss function, and repeated multiple times until the third target loss function converges, that is, the loss function converges, specifically, a total loss function of the fifth difference and the sixth difference can be established through the following formula, as follows:

$$L = \lambda_{params} L_{params} + \lambda_{3d} L_{3d}$$

Among them, L represents the third target loss function, $\lambda_{params}$ and $\lambda_{3d}$ represent preset weight coefficients. Based on the third target loss function, performing an optimization on the network parameters of the third preset network model and the fifth preset network model according to the stochastic gradient descent algorithm, and repeatedly performing for generating the third target loss function. The third network parameters of the fourth preset network model and the fifth preset network model are iteratively optimized through the third target loss function that is continuously updated, calculating the third network parameters for iteratively adjustment until the third target loss function in this part converges, and the fourth target preset network model and the fifth target preset network model that have been trained are obtained. Since the second network parameters of the first target preset backbone model, the first target preset network model, the second target preset network model, the third target preset network model, the shared identity coefficient, and the shared texture coefficient that have been trained already have trained, so the second network parameters are fixed during this training process. The fourth target preset network model that has been trained can output accurate identity coefficient based on the first image feature and the fifth target preset network model that has been trained can output accurate texture coefficient based on the first image feature.

Based on this, each first target image feature can be input into the fourth target preset network model and the fifth target preset network model that have been trained separately, and correspondingly the accurate target identity coefficient and the accurate target texture coefficient can be respectively output.

In block 103, determining the first target identity coefficient and the first target texture coefficient, the first target identity coefficient is an identity coefficient of the face image corresponding to the first target image feature in a different frame of the target video. The first target texture coefficient is a texture coefficient of the face image corresponding to the first target image feature in the different frame of the target video, and the first target identity coefficient and the first target texture coefficient are taken from the face image of a same frame.

Among them, since the target video in the embodiment of the present application includes face images of the same subject in a short time, the identity coefficients and the texture coefficients of different face images are very close, based on this principle, under a same target video, the first target identity coefficient and the first target texture coefficient corresponding to the first image feature in the face image of other different frame in the target video can be obtained as the prior identity coefficient and prior texture coefficient. The first target identity coefficient and the first target texture coefficient can be obtained by simply inputting the image feature of the face image of the different frame into the fourth target preset network model and the fifth target preset network model that have been trained, that is, the first target identity coefficient is the identity coefficient of the face image corresponding to the first target image feature in the different frame of the target video, and the first target texture coefficient is the texture coefficient of the face image corresponding to the first target image feature in the different frame of the target video. The first target identity coefficient and the first target texture coefficient are taken from the face image of a same frame.

In block 104, determining a first target identity feature based on the first target identity coefficient.

In one embodiment, the computer device can input the first target identity coefficient into the second target preset backbone model and output the first target identity feature.

Among them, the second target preset backbone model is used to extract a common feature of the first target identity coefficient. The second target preset backbone model can use a multi-layer perceptron network structure as a backbone network, such that the first target identity coefficient can be input into the second target preset backbone model and the corresponding first target identity feature can be output. A scale of the first target identity feature is consistent with a scale of the first image feature. For example, the first target identity coefficient can be 1*80 dimensions, and an output of the second target preset backbone model can be 1*40 dimensions, which can be copied and augmented according to a scale of the first image feature to obtain the first target identity feature, which can be 28*28*40. It can be understood that a consistent scale means that scales of a length and a width are same, and scales of channels are not required to be consistent.

It should be noted that the network parameters of the second target preset backbone model may be determined in advance. It can also be obtained through training. Please refer to the subsequent blocks for the specific training process.

In block 105, determining a first target texture feature based on the first target texture coefficient.

In one embodiment, the computer device can input the first target texture coefficient into the third target preset backbone model and output the first target texture feature.

Among them, the third target preset backbone model is used to extract a common feature of the first target texture coefficient. The third target preset backbone model can adopt a multi-layer perceptron network structure as a backbone network.

In this way, the first target texture coefficient can be input into the third target preset backbone model, and the corresponding first target texture feature can be output. A scale of the first target texture feature is consistent with the scale of the first image feature. For example, the first target texture coefficient can be 1*80 dimensions, and an output of the third target preset backbone model can be 1*40 dimensions, which is copied and augmented according to the scale of the first image feature to obtain the first target texture feature. The scale of the first target texture feature can be 28*28*40. It can be understood that the consistent scale means that scales of the length and width are consistent, and the scales of the channels are not required to be consistent.

It should be noted that network parameters of the third target preset backbone model can be determined in advance. It can also be obtained through training. Please refer to the subsequent blocks for the specific training process.

In block 106, splicing the first target image feature, the first target identity feature, and the first target texture feature, and obtaining the first target feature.

Among them, the first target image feature, the first target identity feature, and the first target texture feature can be spliced according to data dimension channel to obtain the first target feature. In this way, the first target feature can carry relevant information of a second target identity coefficient and a second target texture coefficient corresponding to the prior identity coefficient and the prior texture coefficient.

In block 107, determining a first target expression coefficient based on the first target feature.

In one embodiment, the computer device can input the first target feature into the target preset head network model and output the first target expression coefficient.

Among them, combined with the prior identity coefficients and the prior texture coefficients corresponding to the face images in different frames in the target video, a prediction optimization training is performed to obtain the target preset head network model that has been trained. A preset head network model before the target preset head network model is trained can adopt a 4-layer ResBlock structure and a fully connected layer structure at the end to predict the first predicted expression coefficient. Since the preset head network model has not been trained completely, therefore, the first predicted expression coefficient that is predicted is not the optimal value.

Although the aforementioned first preset network model and the preset head network model have the same network structure and both output expression coefficients, the first preset network model outputs the expression coefficient based on the face image that is singly input, and the preset head network model outputs the expression coefficient based on the face image, the prior identity coefficient, and the prior texture coefficient that are input.

In other words, the preset head network model can receive other prior information in addition to the face image. In video scenes, the preset head network model can make use of the prior information provided by past video frames, making it more suitable for use in video scenes and further improving a prediction accuracy of the expression coefficient.

In some embodiments, a process of prediction optimization training of the preset head network model is as follows:

Block 1, generating a first target loss function. In one embodiment, the generating of the first target loss function includes:

(1) Outputting a first identity feature by inputting the first target identity coefficient into the second preset backbone model;

(2) Outputting a first texture feature by inputting the first target texture coefficient into the third preset backbone model;

(3) Obtaining a first feature by splicing the first target image feature, the first identity feature, and the first texture feature;

(4) Outputting the first predicted expression coefficient by inputting the first feature into the preset head network model;

(5) Generating a first predicted face three-dimensional model based on the first target identity coefficient, the first target texture coefficient, the first predicted expression coefficient, the first target posture coefficient, and the first target lighting coefficient;

(6) Obtaining a first difference between a first face estimated value corresponding to the first predicted face three-dimensional model and an unoccluded area in the face image corresponding to the first identity feature that is input;

(7) Obtaining a second difference between first predicted face three-dimensional key points corresponding to the first predicted face three-dimensional model and face three-dimensional key points in the face image corresponding to the first identity feature that is input;

(8) Establishing the first target loss function based on the first difference and the second difference;

Block 2, performing a training based on the first target loss function. In one embodiment, a processing of the training is as follows:

Performing an iterative optimization on the first network parameters of the second preset backbone model, the third preset backbone model, and the preset head network model according to the first target loss function, until the first target loss function converges, and the second target preset backbone model, the third target preset backbone model, and the target preset head network model that have been trained are obtained.

Among them, the second preset backbone model is used to extract the common feature of the first target identity coefficient, the third preset backbone model extracts the common feature of the first texture identity coefficient, and the preset head network model is used to predict the expression coefficient, the first target identity coefficient can be input into the second preset backbone model to output the first identity feature; the first target texture coefficient can be input into the third preset backbone model to output the first texture feature.

The first target image feature, the first identity feature and the first texture feature are spliced to obtain the first feature. In this way, the first feature can carry the relevant information of the first identity coefficient and the first texture coefficient corresponding to the prior identity coefficient and the prior texture coefficient, but since the second preset backbone model and the third preset backbone model are both untrained network models, the first feature is not yet an optimal value.

The first feature can be input into the preset head network model and the first predicted expression coefficient that is predicted can be output.

In the related technology, since there is no "true value of coefficient" as a label for recursive training, it is impossible to directly measure whether the first predicted expression coefficient that is predicted is good or bad. In order to solve the above problem, embodiments of the present application can use a method of indirect measurement, that is, can obtain the label identity coefficient, the label texture coefficient, the first predicted expression coefficient, the label posture coefficient and the label lighting coefficient, and generate the first predicted face 3D model (including face 3D geometry and face texture).

The label identity coefficient may be the aforementioned shared identity coefficient that has been trained or may be a target expression coefficient output by inputting the first target image feature into the first target preset network model. The label posture coefficient may be a target posture coefficient output by inputting the first target image feature into the second target preset network model. The label lighting coefficient may be a target lighting coefficient output by inputting the first target image feature into the third target preset network model. The label identity coefficient may be a target identity coefficient output by inputting the first target image feature into the fourth target preset network model. The label texture coefficient may be the aforementioned shared texture coefficient after training or a target texture coefficient output by inputting the first target image feature into the fifth target preset network model.

Further, the first face estimated value is a 2-dimensional image obtained by rendering a current estimated value (geometry, texture) of the constructed first predicted face three-dimensional model by a differentiable renderer.

A first difference between the first face estimated value corresponding to the first predicted face three-dimensional model and the unoccluded area in the face image (i.e., the original image) can be determined. The greater the first difference is, the less closer the first face estimated value is to the face image, and correspondingly, it means that the less accurate the first predicted expression coefficient is, on the contrary, the smaller the first difference is, the closer the first face estimated value is to the face image, and correspondingly, it means that the more accurate the first predicted expression coefficient is.

When determining the first difference corresponding to the first predicted face three-dimensional model, the reason why the unoccluded area M is introduced is that the 3DMM model cannot express an occlusion, resulting in that all the "face image estimated values constructed by the coefficient estimated values" are complete faces. If the "face image true value" is not a complete face, such as wearing sunglasses, the difference between the two should not be compared at an occluded part, so we choose to use M to remove the occluded part and only compare the unoccluded part of the face. Therefore, during training, some common occlusions can be attached to the face image online based on the 3D key points of the face image. For example, the image of sunglasses is scaled and pasted to the human eyes according to the scale of the key points of the human eyes, resulting in augmentation at image levels such as partial occlusion of the face image, and enhancing the robustness of the deep neural network to face occlusion.

The second difference between the first predicted face three-dimensional key points corresponding to the first predicted face three-dimensional model and the face three-dimensional key points of the real face image can also be obtained. Specifically, vertices of semantic positions of the face 3D key points used by the first predicted face three-dimensional model can be projected onto an image to obtain the current estimated value of the face 3D key points (the first predicted face 3D key points), and calculate the second difference between the current estimated value and the true value of the face three-dimensional key points of the real face image in the unoccluded area M. The greater the second difference is, the less closer the first predicted face three-dimensional key points are to the real face three-dimensional key points, and correspondingly, the less accurate the first predicted expression coefficient is; on the contrary, the smaller the second difference is, the closer the predicted first predicted face three-dimensional key points are to the real face three-dimensional key points, and correspondingly, the more accurate the first predicted expression coefficient is, and the first target loss function is established according to the first difference and the second difference.

Finally, performing an iterative optimization on the first network parameters of the second preset backbone model, the third preset backbone model, and the preset head network model according to the first target loss function, until the first target loss function converges, and obtaining the second target preset backbone model, the third target preset backbone model and the target preset head network model that have trained. That is, the second preset backbone model, the third preset backbone model and the preset head network model can be optimized using the stochastic gradient descent algorithm according to the first target loss function, and repeatedly performing to generate the first target loss function for multiple times, the first network parameters of the second preset backbone model, the third preset backbone model and the preset head network model are iteratively optimized through the first target loss function that is continuously updated, until the first target loss function, that is, the loss function converges, and the preset head network model that has been trained is obtained.

Based on this, the first target feature corresponding to the first target image feature can be input into the target preset head network model that has been trained to output an accurate first target expression coefficient. Due to an introduction of an additional constraint of the prior identity coefficient and the prior texture coefficient, and make use of prior information provided by past video frames, it is more suitable for use in video scenes. The first target feature corresponding to the first target image feature extracted from the first target image of each frame in the target video can be input into the target preset head network model, and the first target expression coefficient corresponding to each frame of the video is output. Using the first target expression coefficient that is output can further improve the accuracy.

As can be seen from the above, the embodiment of the present application obtains the target video; inputs the face image of each frame into the first target preset backbone model, and outputs the first target image feature; obtains the first target identity coefficient and the first target texture coefficient of the face image corresponding to the first target image feature in each of other frames of the target video; inputs the first target identity coefficient into the second target preset backbone model and outputs the first target identity feature; inputs the first target texture coefficient into the third target preset backbone model and outputs the first target texture feature; splices the first target image feature, the first target identity feature and the first target texture feature, and obtains the first target feature; inputs the first target feature into the target preset head network model, and outputs the first target expression coefficient. The embodiment of the present application combines the prior knowledge in the target video to predict the expression coefficient, compared with the solution of directly extracting the expression coefficient through the 3DMM method, the embodiment of the present application greatly improves the accuracy of the expression coefficient that is extracted.

In this embodiment, the information processing device is specifically integrated in a computer device as an example for description. Please refer to the following description for details.

Please refer to FIG. 3, which is another schematic flowchart of an information processing method provided by an embodiment of the present application. The method process may include:

In block 201, the computer device obtains an initial video, extracts a face image of each frame in the initial video, and determines one or more video segments from the initial video, each of the one or more video segments includes at least two frames, and a same object appears in each of the at least two frames.

Among them, the initial video may be a video includes one or more human faces that are clear. The computer device can sequentially extract the face image of each frame in the initial video through the face detection algorithm and the face tracking algorithm, determine the corresponding user identity information through the face image, and then determine a user (i.e., an object) corresponding to the face image through the user identity information.

In block 202, the computer device determines one of the one or more video segments with a number of frames greater than a preset threshold as a first target video segment, obtains a second target video segment by performing a style transformation on the first target video segment, and determines each of the first target video segment and the second target video segment as the target video.

Among them, in order to ensure the subsequent training effect of the target video, the video segment with insufficient number of frames need to be deleted. The preset threshold is used to define whether the number of frames reaches a critical value that meets the training effect, such as 50 frames. In this way, an video segment with a number of frames greater than the preset threshold may be determined as a first target video.

In order to adapt to more application scenarios, the first target video segment can be sample augmented. In one embodiment, the style transformation can include operations of compression, brightness change, hue change, and/or encoding format change without changing a size of the image, with this, performing the style transformation on the first target video segment, and obtaining the second target video segment, i.e., the augmented video segment, and determining each of the first target video segment and the second target video segment as the target video, that is, augmentation of the target video is achieved.

In order to ensure the quality of the target video, the multiplied video will not be further multiplied.

For the convenience of subsequent processing, the face detection algorithm can be used to extract the face image of each frame in the target video, and further extract the face 3D key points in the face image. The face 3D key points determine an expression form of a human face. The target video can be converted into a collection of {a face image, face 3D key points}. It should be noted that when some of the multiplied video is not clear, the corresponding face 3D key points may not be extracted. In order to solve the above problem, the face 3D key points of an original target video corresponding to the multiplied video can be used as the face 3D key points corresponding to the multiplied video that cannot be extracted.

In block 203, the computer device inputs the face image of each frame into the first target preset backbone model, and correspondingly outputs the first target image feature.

In order to realize the decoupling of the expression coefficient and other non-expression coefficients, the embodiments of the present application can set the identity coefficient and the texture coefficient of the face image corresponding to the same object in each frame of the target video in advance. Since the time interval is short, these face images all have the same identity coefficient and the same texture coefficient, that is, a shared identity coefficient and a shared texture coefficient used by the target video of the same object can be set. The shared identity coefficient can be pre-stored in a shared identity coefficient set, and the shared texture coefficient can be pre-stored in a shared texture coefficient set. The set can include K objects that share shared identity coefficient and the shared texture coefficient that are same. The shared identity coefficient set can have K*80 dimensions, where K is a number of sets participating in training in the database, and 80 is the dimension of the shared identity coefficient of the 3DMM used in this article. Specifically, one shared identity coefficient can be expressed as an 80-dimensional vector, and the shared identity coefficient set can include K shared identity coefficients, and the K shared identity coefficients together form a K*80-dimensional matrix. The shared identity coefficient can be initialized to Gaussian noise with a mean of 0 and a variance of 0.1, that is, the shared identity coefficient can be intelligently updated along with the model training process.

The shared texture coefficient can be pre-stored in a shared texture coefficient set, and the shared texture coefficient set can have a dimension of K*80, where K is the number of sets participating in training in the database, and 80 is the shared texture coefficient dimension of the 3DMM used in this article. Specifically, a shared texture coefficient can be represented as an 80-dimensional vector, and the shared texture coefficient set can include K shared texture coefficients, and the K shared texture coefficients together form a K*80-dimensional matrix. The shared texture coefficient can be initialized to Gaussian noise with a mean value of 0 and a variance of 0.1, that is, the shared texture coefficient can be intelligently updated along with the model training process.

Figure 4A:
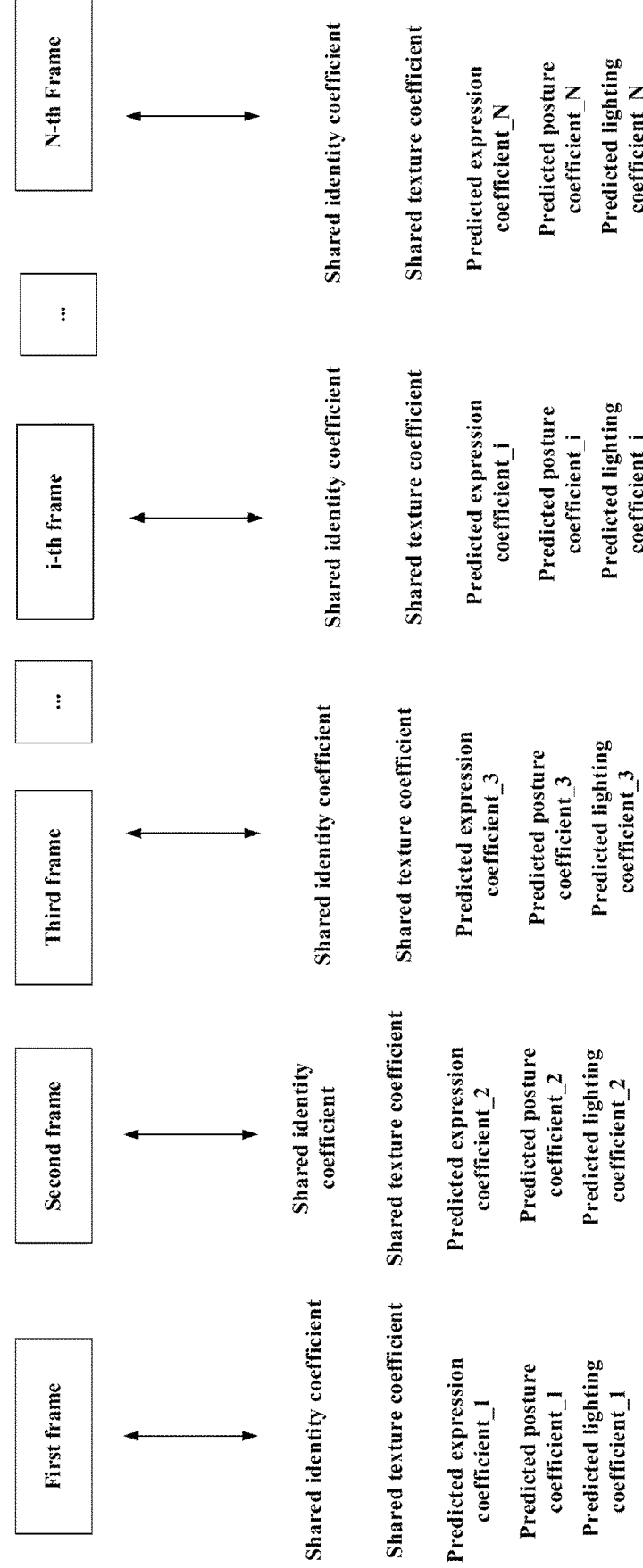
FIG. 4A is a schematic diagram of a scene of the infor-mation processing method provided by an embodiment of the present application.

For example, as shown in FIG. 4A, the face image of each frame in the target video has the same shared identity coefficient and same shared texture coefficient, and the predicted expression coefficient, the predicted posture coefficient, and the predicted lighting coefficient of each frame are independent.

In order to achieve the introduction of additional constraint on the identity coefficient and the texture coefficient to resolve ambiguity, the decoupling of the expression coefficient and non-expression coefficients is achieved.

Figure 4B:
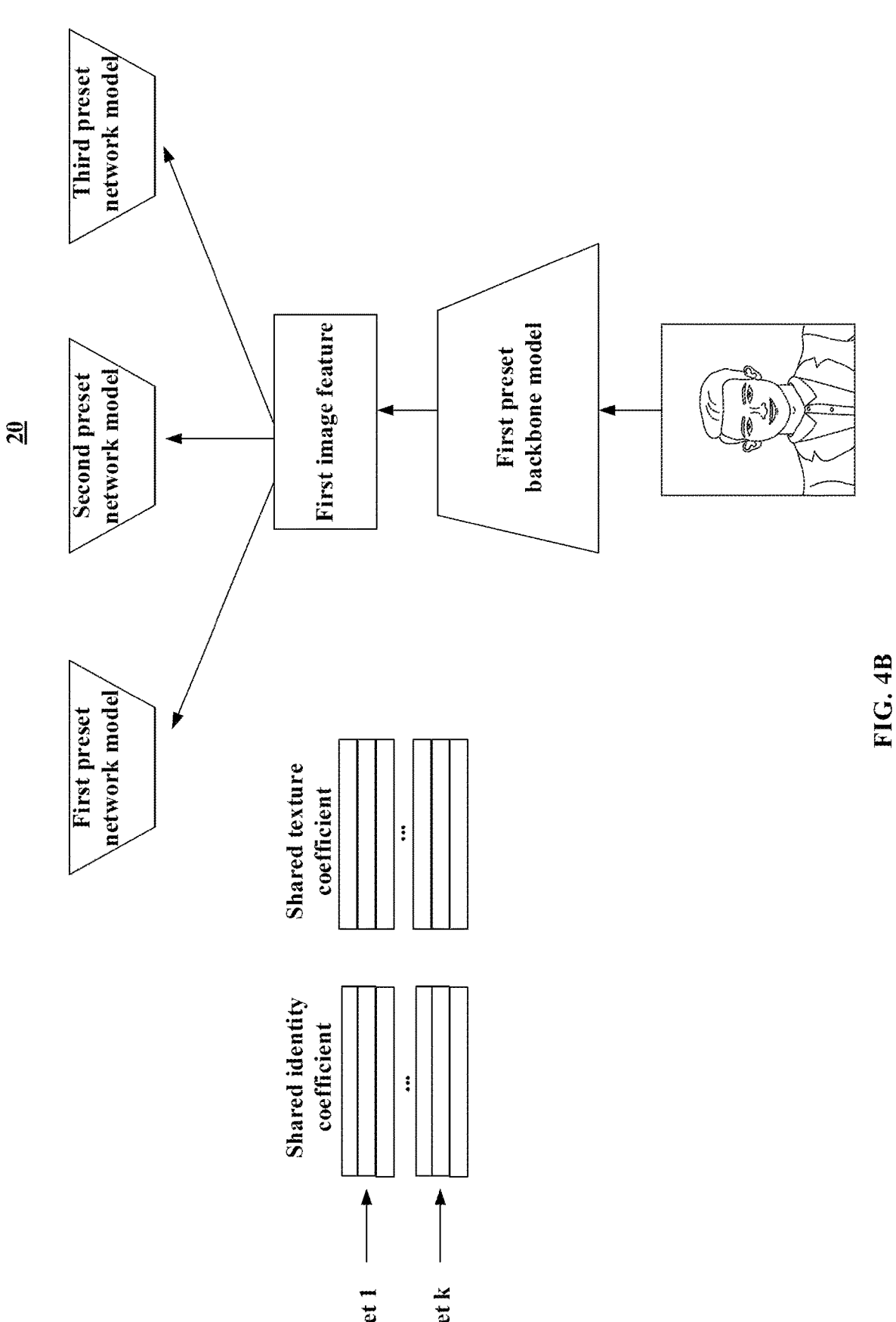
FIG. 4B is a schematic diagram of a framework of the information processing system provided by an embodiment of the present application.

In some embodiments, the training process of the first target preset backbone model can be as follows:

Please refer to FIG. 4B as well, FIG. 4B is a schematic diagram of a framework 20 of the information processing system provided by one embodiment of the present application. The first image feature represents a common feature of the face image of each frame. The first preset backbone model can use a 4-layer ResBlock network structure as a backbone network, the computer device can input the face image of each frame into the first preset backbone model sequentially, and output the first image feature corresponding to the face image of each frame. A scale of the first image feature can be 28*28*128.

Referring to FIG. 4B, the first preset network model is used to predict the expression coefficient, the second preset network model is used to predict the posture coefficient, and the third preset network model is used to predict the lighting coefficient. The first preset network model, the second preset network model, and the third preset network model can have similar structures, that is, they can adopt a 4-layer ResBlock structure and a fully connected layer structure at the end. In one embodiment, the first preset network model, the second preset network model and the third preset network model can also adopt different network structures, and the examples here are not specifically limited. Based on this, each first image feature can be input into the first preset network model, the second preset network model and the third preset network model respectively, and the first predicted expression coefficient, the first predicted posture coefficient and the first predicted lighting coefficient that are predicted can be output. Since the first preset network model, the second preset network model and the third preset network model have not completed the training, the first predicted expression coefficient, the first predicted posture coefficient and the first predicted lighting coefficient are not optimal.

Among them, please continue to refer to FIG. 4B, since there is no "true value of coefficient" as a label for recursive training, it is impossible to directly measure whether the intermediate predicted expression coefficient, the first predicted posture coefficient, and the first predicted lighting coefficient that are predicted are good or bad. In order to solve the above problem, the embodiment of the present application can adopt an indirect measurement method, that is, the shared identity coefficient and the shared texture coefficient corresponding to the face image of the same object corresponding to the target video can be first obtained, and then based on the shared identity coefficient, the shared texture coefficient, and the intermediate predicted expression coefficient, the first predicted posture coefficient and the first predicted lighting coefficient, generate the intermediate predicted face 3D model (including the face 3D geometry and the face texture).

Among them, the intermediate face estimated value is a 2-dimensional image obtained by rendering a current estimated value (geometry, texture) of the constructed intermediate predicted face three-dimensional model through a differentiable renderer.

The third difference between the intermediate face estimated value corresponding to the intermediate predicted face 3D model and the unoccluded area in the face image (i.e., the original image) can be determined. During training, some common occlusions can be attached to the face image online according to the face 3D key points of the face image. For example, an image of sunglasses can be scaled and attached to the human eyes according to the scale of the key points of the human eyes, resulting in augmentation at image levels such as partial occlusion of the face image, and enhancing the robustness of the deep neural network to face occlusion. The greater the third difference is, the less closer the intermediate face estimated value is to the face image, and correspondingly, it indicates that the first image feature, the intermediate predicted expression coefficient, the first predicted posture coefficient, the first predicted lighting coefficient, the shared identity coefficient, and the shared texture coefficient are less accurate, on the contrary, the smaller the third difference is, it indicates that the intermediate face estimated value is closer to the face image, and correspondingly, it indicates that the first image feature, the intermediate predicted expression coefficient, the first predicted posture coefficient, and the first predicted lighting coefficient, the shared identity coefficient, and the shared texture coefficient are more accurate. The third difference can be calculated by the following formula:

$$L_{rec} = \frac{\sum_{i \in M} M_i \|I_i - \hat{I}_i\|}{\sum_{i \in M} M_i}$$

It is also possible to obtain the fourth difference between the intermediate predicted face three-dimensional key points corresponding to the intermediate predicted face three-dimensional model and the face three-dimensional key points of a real face image. Specifically, vertices of semantic positions of the face 3D key points used in the intermediate predicted face 3D model can be projected onto the image to obtain the current estimated value k of the face 3D key points (intermediate predicted face 3D key points), calculate the fourth difference between the current estimated value k and a true value K of the face three-dimensional key points of the real face image in the unoccluded area M. The larger the fourth difference is, the less closer the predicted intermediate face three-dimensional key points are to the real face three-dimensional key points, and correspondingly, it means that the first preset backbone model, the intermediate predicted expression coefficient, the first predicted posture coefficient, the first predicted lighting coefficient, the shared identity coefficient and the shared texture coefficient are less accurate; on the contrary, the smaller the fourth difference is, the closer the predicted intermediate face three-dimensional key points are to real face three-dimensional key points, and correspondingly, it means that the first preset backbone model, the intermediate predicted expression coefficient, the first predicted posture coefficient, the first predicted lighting coefficient, the shared identity coefficient and the shared texture coefficient are more accurate. The fourth difference can be calculated by the following formula:

$$L_{lan} = \frac{\sum_{i \in M} w_i \|k_i - \hat{k}_i\|}{N}$$

Among them, $L_{lan}$ represents the fourth difference, and $w_i$ represents a weight. Each key point has a different weight, that is, when calculating the loss function, errors of some key points are more important than errors of other key points. The values of these weights are predefined in technical implementation. $k_i$ represents a true value of the i-th face 3D key point, and $\hat{k}_i$ represents the current estimated value of the i-th face 3D key point of the intermediate predicted face 3D model. N represents a number of key points, for example, 68. The fourth difference is calculated through the above formula, which can be understood as the loss function of the fourth difference.

A constraint relationship between the shared identity coefficient, the shared texture coefficient, and the intermediate predicted expression coefficient can also be established through a regularization loss function to constrain the constraint relationship between the shared identity coefficient, the shared texture coefficient and the first predicted expression coefficient not to deviate too much from the mean of zero, it can be calculated by the following formula:

$$L_{reg} = \alpha_d \|\hat{d}\| + \alpha_t \|\hat{t}\| + \alpha_e \|\hat{e}\|$$

Among them, $\alpha_d$, $\alpha_t$, and $\alpha_e$ represent preset weight coefficients used to balance various loss functions, $\hat{d}$ represents the shared identity coefficient, $\hat{t}$ represents the shared texture coefficient and $\hat{e}$ represents the intermediate predicted expression coefficient. The above formula can be understood as a constrained loss function.

A corresponding second target loss function can be generated according to the third difference, the fourth difference, and the constraint relationship.

Finally, the iterative optimization is performed on the second network parameters of the first preset backbone model, the first preset network model, the second preset network model, the third preset network model, the shared identity coefficient, and the shared texture coefficient according to the second target loss function.

Among them, the computer device returns to the block of inputting the face image of each frame into the first preset backbone model and outputting the first image feature to iteratively optimize the second network parameters until the second target loss function converges, and obtains the first target preset backbone model, the first target preset network model, the second target preset network model, the third target preset network model, the shared identity coefficient and the shared texture coefficient that have been trained.

That is, the second network parameters of the first preset backbone model, the first preset network model, the second preset network model, the third preset network model, the shared identity coefficient, and the shared texture coefficient can be optimized using a stochastic gradient descent algorithm according to the second target loss function, and repeatedly performing until the second loss function converges, i.e., the loss function converges. Specifically, the second target loss function of the third difference, the fourth difference, and the constraint relationship can be established through the following formula, as follows: $L=\lambda_{rec}L_{rec}+\lambda_{lan}L_{lan}+\lambda_{reg}L_{reg}$ $\lambda_{rec}$, $\lambda_{lan}$, and $\lambda_{reg}$ represent preset weight coefficients used to balance various loss functions, L represents the second target loss function. Based on the second target loss function, the second network parameters of the first preset backbone model, the first preset network model, the second preset network model, the third preset network model, the shared identity coefficient, and the shared texture coefficient are optimized according to the stochastic gradient descent algorithm, and repeatedly input the face image of each different frame into the first preset backbone model, and output the first image features, iteratively calculate a second target loss and perform an iterative adjustment until the second target loss converges, and obtain the trained second target loss function that is converged, and obtain the first target preset backbone model, the first target preset network model, the second target preset network model, the third target preset network model, the shared identity coefficient, and the shared texture coefficient that have been trained.

In this way, the first target backbone model that has been trained can output accurate first target image feature based on the face image. The first target preset network model, the second target preset network model, and the third target preset network model that have been trained can output accurate expression coefficient, accurate posture coefficient, and accurate lighting coefficient.

The computer device can input the face image of each frame into the first target preset backbone model, and output the first target image feature, and then input the first target image feature into the first target preset network model that has been trained to output an accurate target expression coefficient. Input the first target image feature into the second target preset network model that has been trained and output accurate target posture coefficient. Input the first target image feature into the third target preset network model that has been trained, and output an accurate target preset network model. Since the additional constraint of the shared identity coefficient and the shared texture coefficient is introduced, i.e., the identity coefficient and the texture coefficient are pre-defined, the decoupling of the target expression coefficient and other non-expression coefficients is achieved, the accuracy of the target expression coefficient is improved.

Figure 4C:
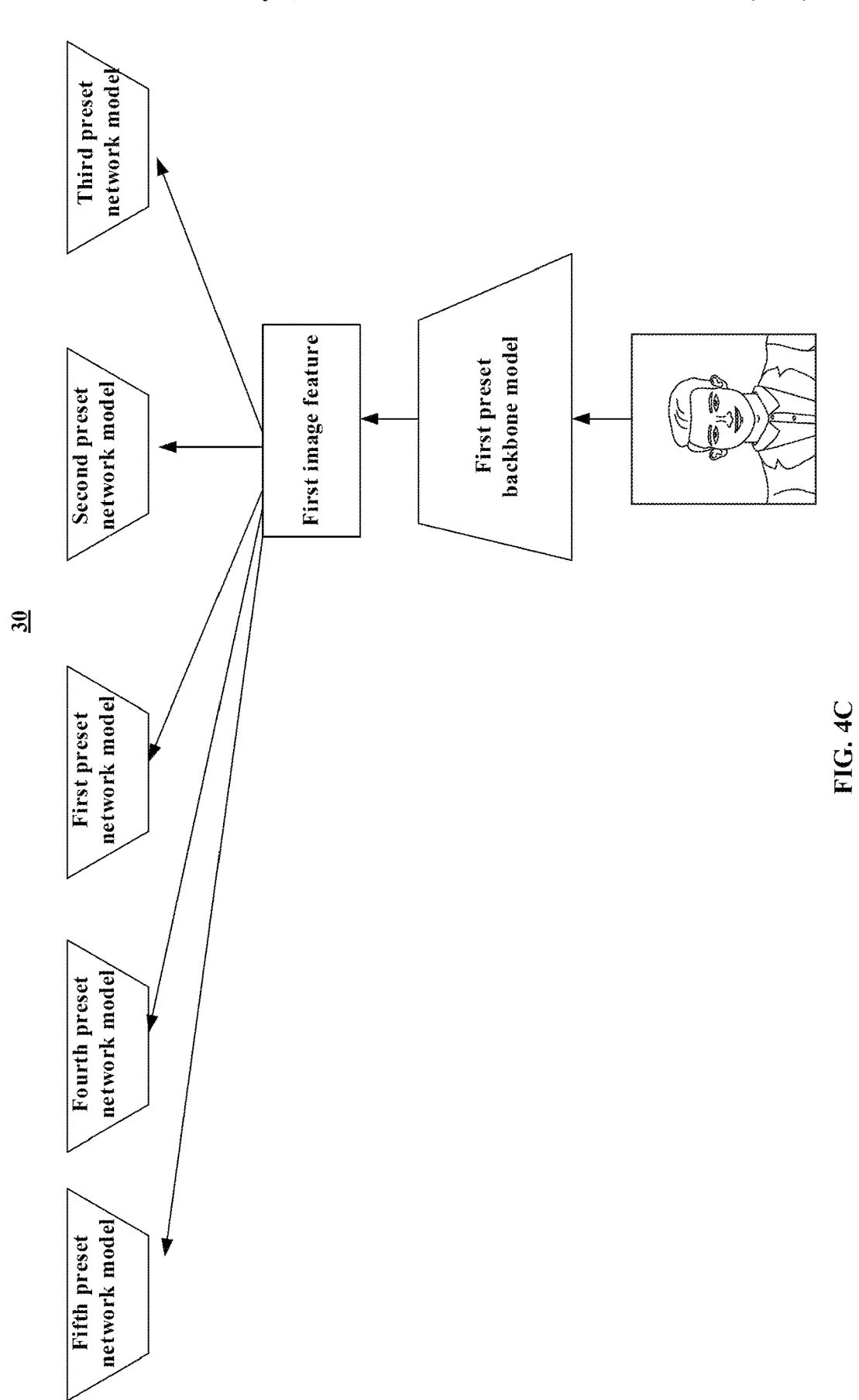
FIG. 4C is a schematic diagram of another framework of the information processing system provided by an embodi-ment of the present application.

Among them, please refer to FIG. 4C, FIG. 4C is a schematic diagram of another framework 30 of the information processing system provided by one embodiment of the present application, the fourth preset network model is used to predict the identity coefficient, and the fifth preset network model is used to predict the texture coefficient, the fourth preset network model and the fifth preset network model can have similar structures, that is, they can adopt a 4-layer ResBlock structure and a fully connected layer structure at the end, the fourth preset network model and the fifth preset network model can also adopt different network structures, and examples here are not used as specific limitations. Based on this, the computer device can input the first target image feature into the fourth preset network model and the fifth preset network model separately, and correspondingly output the predicted first predicted identity coefficient and the first predicted texture coefficient respectively. Due to the fourth preset network model and the fifth preset network model has not completed the training, therefore, the first predicted identity coefficient and the first predicted texture coefficient are not optimal values, so the fourth preset network model and the fifth preset network model need to be trained.

In one embodiment, the shared identity coefficient can be used as the label identity coefficient and the shared texture coefficient can be used as the label texture coefficient. However, in order to further train and improve the prediction accuracy of the fourth preset network model and the fifth preset network model, the embodiment of the present application can generate a second predicted face three-dimensional model (including face 3D geometry and face texture) according to the first predicted identity coefficient, the first predicted texture coefficient, the intermediate target expression coefficient, the first target posture coefficient, and the first target lighting coefficient.

Further, the fifth difference can be established based on the difference between the first predicted identity coefficient and the label identity coefficient and the difference between the first predicted texture coefficient and the label texture coefficient. The greater the fifth difference is, the less closer the first predicted identity coefficient is to the real label identity coefficient and the less closer the first predicted texture coefficient is to the real label texture coefficient, correspondingly, it indicates that the first predicted identity coefficient and the first predicted texture coefficient are less accurate, on the contrary, the smaller the fifth difference is, it indicates that the first predicted identity coefficient is closer to the real label identity coefficient and the first predicted texture coefficient is closer to the real label texture coefficient, correspondingly, it indicates that the first predicted identity coefficient and the first predicted texture coefficient are more accurate. The fifth difference can be calculated by the following formula:

$$L_{params}=\beta_d\|\hat{d}-d_{gt}\|+\beta_t\|\hat{t}-t_{gt}\|$$

Among them, $L_{params}$ represents the fifth difference, $\beta_d$ and $\beta_t$ represent preset weight coefficients, $\hat{d}$ represents the first predicted identity coefficient, $d_{gt}$ represents the label identity coefficient, $\hat{t}$ represents the first predicted texture coefficient, $t_{gt}$ represents the label texture coefficient, and the fifth difference can be calculated by the above formula.

The predicted geometric information and the predicted texture information of the second predicted face three-dimensional model can also be determined. The predicted geometric information and the predicted texture information are not optimal values, so it is necessary to establish the sixth difference based on the difference between the predicted geometric information and the real label geometric information and the difference between the predicted texture information and the real label texture information. The greater the sixth difference is, it indicates that the less closer the predicted geometric information is to the real label geometry information and the less closer the first predicted texture coefficient is to the real label texture coefficient, correspondingly, it is indicates that the first predicted identity coefficient and the first predicted texture coefficient are less accurate, on the contrary, the smaller the sixth difference is, it indicates that the closer the predicted geometric information is to the real label geometry information and the closer the first predicted texture coefficient is to the real label texture coefficient, correspondingly, it means that the first predicted identity coefficient and the first predicted texture coefficient are more accurate. The sixth difference can be calculated by the following formula:

$$L_{3d} = \beta_{geo} \|\hat{S} - S_{gt}\| + \beta_{tex} \|\hat{T} - T_{gt}\|$$

Among them, $L_{3d}$ represents the sixth difference, $\beta_{geo}$ and $\beta_{tex}$ represent preset weight coefficients, $S_{gt}$ represents the label geometry information, $\hat{S}$ represents the prediction geometry information, $T_{gt}$ represents the label texture information, and $\hat{T}$ represents the prediction texture information. The sixth difference is calculated using the above formula. And the third target loss function is established based on the fifth difference and the sixth difference.

Finally, the third network parameters of the fourth preset network model and the fifth preset network model are iteratively optimized according to the third target loss function until the third target loss function converges, and the fourth target preset network model and the fifth target preset network model that have been trained are obtained. That is, the fourth preset network model and the fifth preset network model can be optimized using the stochastic gradient descent algorithm according to the third target loss function, and repeated multiple times until the third target loss function converges, that is, the loss function converges, specifically, a total loss function of the fifth difference and the sixth difference can be established through the following formula, as follows:

$$L = \lambda_{params} L_{params} + \lambda_{3d} L_{3d}$$

Among them, L represents the third target loss function, $\lambda_{params}$ and $\lambda_{3d}$ represent preset weight coefficients. Based on the third target loss function, performing an optimization on the network parameters of the third preset network model and the fifth preset network model according to the stochastic gradient descent algorithm, and repeatedly input different first target image features into the fourth preset network model and the fifth preset network model, and calculate the third target loss function for iterative adjustment, until the third target loss function in this part converges, and the fourth target preset network model and the fifth target preset network model that have been trained are obtained. Since the second network parameters of the first target preset backbone model, the first target preset network model, the second target preset network model, the third target preset network model, the shared identity coefficient, and the shared texture coefficient that have been trained already have trained, so the second network parameters are fixed during this training process. The fourth target preset network model that has been trained can output accurate identity coefficient based on the first image feature and the fifth target preset network model that has been trained can output accurate texture coefficient based on the first image feature.

Based on this, the computer device can input the first target image feature into the fourth target preset network model and the fifth target preset network model that have been trained respectively, and output the accurate target identity coefficient and the accurate target texture coefficient.

In block 204, the computer device obtains the first identity coefficient and the first texture coefficient of the face image corresponding to the first target image feature in a previous frame of the target video, the previous frame is a frame located before but is adjacent to the frame corresponding to the face image input in block 203, obtains the second identity coefficient and the second texture coefficient corresponding to the first target image feature, obtains the first target identity coefficient corresponding to the first target image feature by performing a weighted summation on the first identity coefficient and the second identity coefficient, obtains the first target texture coefficient corresponding to the first target image feature by performing a weighted summation on the first texture coefficient and the second texture coefficient, outputs the first identity feature by inputting the first target identity coefficient into the second preset backbone model, outputs the first texture feature by inputting the first target texture coefficient into the third preset backbone model, and obtains the first feature by splicing the first target image feature, the first identity feature and the first texture feature.

Among them, since the target video of the embodiment of the present application are the face images of the same object in a short time, the identity coefficients and the texture coefficients between different face images are very close. In this way, a stable estimation strategy of the identity coefficient and the texture coefficient can be implemented in video scenes. For example:

Starting from a face image $I_0$ of a first frame, the target image feature corresponding to $I_0$ are input into the fourth target preset network model and the fifth target preset network model, and the corresponding second identity coefficient $\hat{d}_{I_0}$ and the second texture coefficient $\hat{t}_{I_0}$ are output, since the face image $I_0$ of the first frame does not have a reference image of the previous frame, the second identity coefficient $\hat{d}_{I_0}$ can be used as the first target identity coefficient $\hat{d}_{prior}$, and the first texture coefficient $\hat{t}_{I_0}$ can be used as the first target texture coefficient $\hat{t}_{prior}$.

Further, starting from a face image $I_k$ of a K-th frame (K is greater than or equal to 2), input the face image $I_k$ into the fourth target preset network model and the fifth target preset network model, and input the corresponding second identity coefficient $\hat{d}_{I_k}$ and the second identity coefficient $\hat{t}_{I_k}$.

The first identity coefficient and the first texture coefficient of the face image corresponding to the first target image feature in the previous frame of the target video are obtained as the prior identity coefficient and the prior texture coefficient. For example, when K=2, the previous frame, i.e., the first target identity coefficient $\hat{d}_{prior}$ of the first frame is used as the first identity coefficient, and the first target texture coefficient $\hat{t}_{prior}$ is used as the first texture coefficient.

Please also refer to the following formula:

$$\hat{d}_{prior} = 0.1 * \hat{d}_{I_k} + 0.9 * \hat{d}_{prior} \tag{1}$$

$$\hat{t}_{prior} = 0.1 * \hat{t}_{I_k} + 0.9 * \hat{t}_{prior} \tag{2}$$

Through the above formula (1) and formula (2), the second identity coefficient of the second frame and the first identity coefficient of the first frame can be weighted and summed to obtain the corresponding first target identity coefficient $\hat{d}_{prior}$. The second target texture coefficient of the second frame and the first texture coefficient of the first frame can be weighted and summed to obtain the first target texture coefficient $\hat{t}_{prior}$, the first target identity coefficient $\hat{d}_{prior}$ and the first target texture coefficient $\hat{t}_{prior}$ are used for predicting subsequent target expression coefficient, which can be fused with prior knowledge of the previous frame and can better predict the video, and after predicting the expression of the current frame, the first target identity coefficient $\hat{d}_{prior}$ will replace the second identity coefficient of the current frame and the first target texture coefficient $\hat{t}_{prior}$ will replace the second texture coefficient of the current frame, which is used as a basis for a next frame to obtain the previous frame. By analogy, as the processing of the frames of the video proceeds, the first target identity coefficient and the first target texture coefficient of the face image of each frame starting from the second frame can be combined with the previous prior knowledge and continuously updated.

Input the first target identity coefficient into the second preset backbone model, and output the first identity feature, input the first target texture coefficient into the third preset backbone model, and output the first texture feature, and splice the first target image feature, the first identity feature, and the first texture feature to obtain the first feature.

Figure 4D:
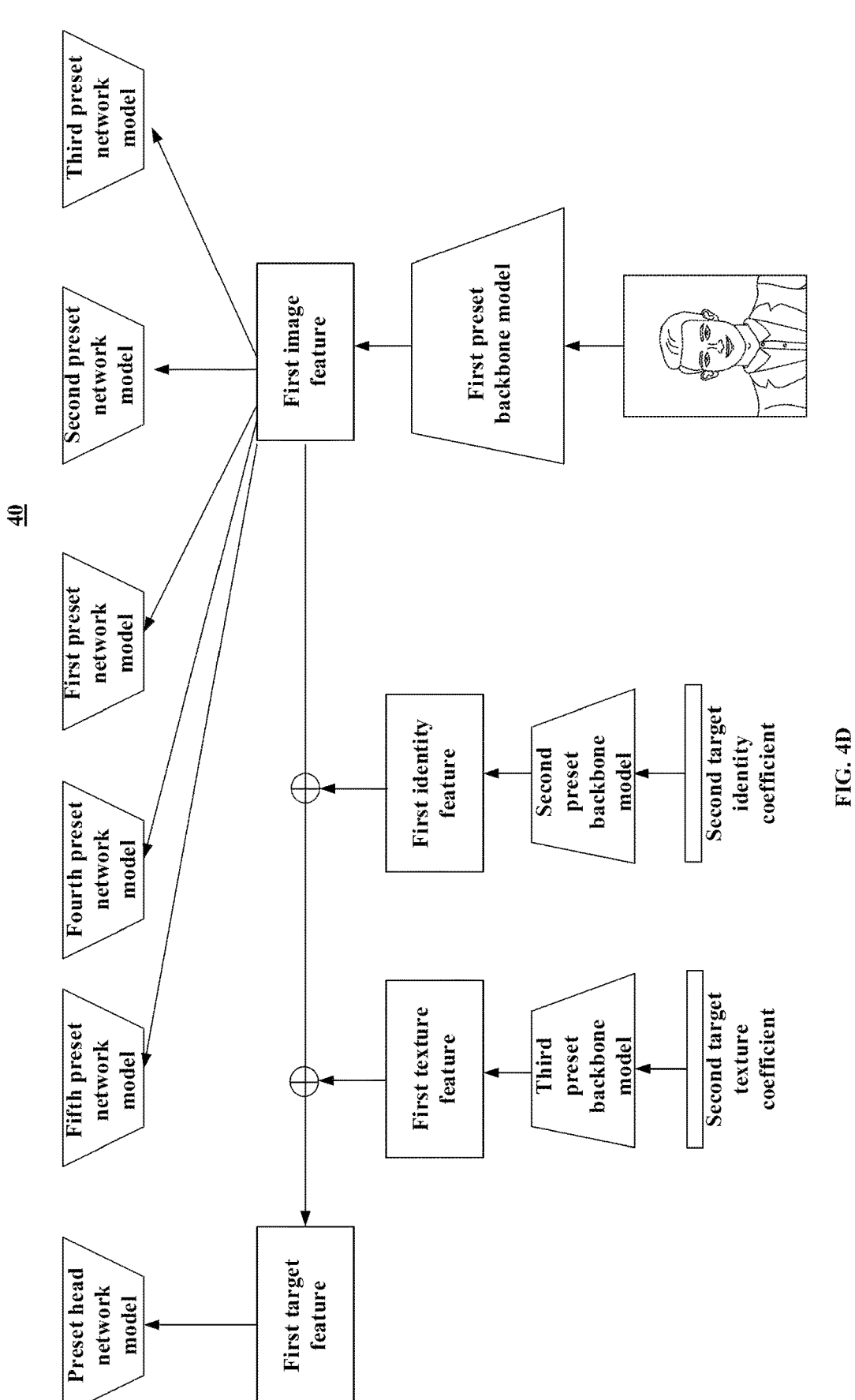
FIG. 4D is a schematic diagram of another framework of the information processing system provided by an embodi-ment of the present application.

Please also refer to FIG. 4D, FIG. 4D is a schematic diagram of another framework 40 of the information processing system provided by one embodiment of the present application. The second preset backbone model is used to extract the common feature of the first target identity coefficient. The second preset backbone model can use a network structure of a multi-layer perceptron as a backbone network. The third preset backbone model is used to extract the common feature of the first target texture coefficient. The third preset backbone model can use the network structure of the multi-layer perceptron as a backbone network, therefore, the first target identity coefficient can be input into the second preset backbone model and the corresponding first identity feature can be output. The first target texture coefficient can be input to the third preset backbone model and the corresponding first texture feature can be output. Scales of the first identity feature and the first texture feature are consistent with a scale of the first target image feature. For example, the first target identity coefficient can be 1*80 dimensions, and an output of the second preset backbone model can be 1*40 dimensions, copy and expand it according to the scale of the first image feature to obtain the first identity feature, which can be 28*28*40; the first target texture coefficient can be 1*80 dimensions, and the output of the third preset backbone model can be 1*40 dimensions, copy and expand it according to the scale of the first image feature to obtain the first texture feature, the scale of the first texture feature can be 28*28*40. It can be understood that a consistent scale means that scales of a length and a width are same, and scales of channels are not required to be consistent.

Since the first target image feature, the first identity feature, and the first texture feature have the same scale, the first target image feature, the first identity feature and the first texture feature can be spliced according to the data dimension channel to obtain the first feature that is spliced, therefore, the first feature can carry relevant information of the first identity feature and the first texture feature corresponding to the prior identity coefficient and the prior texture coefficient.

In block 205, the computer device outputs the first predicted expression coefficient by inputting the first feature into the preset head network model, generates the first predicted face three-dimensional model according to the label identity coefficient, the label texture coefficient, the first predicted expression coefficient, the label posture coefficient, and the label lighting coefficient, obtains the first difference between the first face estimated value corresponding to the first predicted face three-dimensional model and the un-occluded area in the face image, obtains the second difference between the first predicted face three-dimensional key points corresponding to the first predicted face three-dimensional model and the face three-dimensional key points, and establishes the first target loss function based on the first difference and the second difference.

Among them, please continue to refer to FIG. 4D, the target preset head network model that has been trained is obtained by performing the prediction optimization training combining the prior identity coefficient and the prior texture coefficient corresponding to the face image in the different frame of the target video. The preset head network model before the target preset head network model is trained can adopt the 4-layer ResBlock structure and the fully connected layer structure at the end. Based on this, each first feature can be input into the preset head network separately, and the first predicted expression coefficient that is predicted is output. Since the training of the preset head network model has not been completed, the first predicted expression coefficient is not yet an optimal value.

Although the aforementioned first preset network model and the preset head network model have the same network structure and both output expression coefficients, the first preset network model outputs the expression coefficient based the face image that is singly input, and the preset head network model outputs the expression coefficient based on the face image, the prior identity coefficient and the prior texture coefficient that are input.

In other words, the preset head network model can receive other prior information in addition to the face image. In video scenarios, the preset head network model can make use of the prior information provided by past video frames, making it more suitable for use in video scenarios and further improving the prediction accuracy of the expression coefficient.

The preset head network model is used to predict the expression coefficient, the first feature corresponding to the first target image feature can be input into the preset head network model respectively, and the first predicted expression coefficient that is predicted can be output.

In the related technology, since there is no "true value of coefficient" as the label for recursive training, it is impossible to directly measure whether the first predicted expression coefficient that is predicted is good or bad, in order to solve the above problem, embodiments of the present application can use the method of indirect measurement, i.e., obtaining the label identity coefficient, the label texture coefficient, the first predicted expression coefficient, the label posture coefficient, and the label lighting coefficient, and generating the first predicted face 3D model (including face 3D geometry and face texture).

The label identity coefficient may be the aforementioned shared identity coefficient after training or the target expression coefficient output by inputting the first target image feature into the first target preset network model. The label posture coefficient may be the target posture coefficient output by inputting the first target image feature into the second target preset network model. The label lighting coefficient may be the target lighting coefficient output by inputting the first target image feature into the third target preset network model. The label identity coefficient may be the target identity coefficient output by inputting the first target image feature into the fourth target preset network model. The label texture coefficient may be the aforementioned shared texture coefficient after training or the target texture coefficient output by inputting the first target image feature into the fifth target preset network model.

Further, the first face estimated value is a 2-dimensional image obtained by rendering the current estimated value (geometry, texture) of the constructed first predicted face three-dimensional model by the differentiable renderer.

A first difference between the first face estimated value corresponding to the first predicted face three-dimensional model and the unoccluded area in the face image (i.e., the original image) can be determined. The greater the first difference is, the less closer the first face estimated value is to the face image, and correspondingly, it means that the less accurate the first predicted expression coefficient is, on the contrary, the smaller the first difference is, the closer the first face estimated value is to the face image, and correspondingly, it means that the more accurate the first predicted expression coefficient is.

When determining the first difference corresponding to the first predicted face three-dimensional model, the reason why the unoccluded area M is introduced is that the 3DMM model cannot express the occlusion, resulting in that all the "face image estimated values constructed by the coefficient estimated values" are complete faces. If the "face image true value" is not the complete face, such as wearing sunglasses, the difference between the two should not be compared at the occluded part, so we choose to use M to remove the occluded part and only compare the unoccluded part of the face. Therefore, during training, some common occlusions can be attached to the face image online based on the 3D key points of the face image. For example, the image of sunglasses is scaled and pasted to the human eyes according to the scale of the key points of the human eyes, resulting in augmentation at image levels such as partial occlusion of the face image, and enhancing the robustness of the deep neural network to face occlusion.

The second difference between the first predicted face three-dimensional key points corresponding to the first predicted face three-dimensional model and the face three-dimensional key points of the real face image can also be obtained. Specifically, vertices of semantic positions of the face 3D key points used by the first predicted face three-dimensional model can be projected onto an image to obtain the current estimated value of the face 3D key points (the first predicted face 3D key points), and calculate the second difference between the current estimated value and the true value of the face three-dimensional key points of the real face image in the unoccluded area M. The greater the second difference is, the less closer the first predicted face three-dimensional key points are to the real face three-dimensional key points, and correspondingly, the less accurate the first predicted expression coefficient is, on the contrary, the smaller the second difference is, the closer the predicted first predicted face three-dimensional key points are to the real face three-dimensional key points, and correspondingly, the more accurate the first predicted expression coefficient is. And the first target loss function is established according to the first difference and the second difference.

In block 206, the computer device optimizes the first network parameters of the second preset backbone model, the third preset backbone model and the preset head network model according to the first target loss function separately, returns to input the first target identity coefficient into the second preset backbone model and outputs the first identity feature to iteratively optimize the first network parameters until the first target loss function converges, and correspondingly obtains the second target preset backbone model, the third target preset backbone model, and the target preset head network model that have been trained.

Among them, please continue to refer to FIG. 4D, the computer device can optimize the first network parameters of the second preset backbone model, the third preset backbone model and the preset head network model according to the first target loss function, and returns to the block of outputting the first identity feature by inputting the first target identity coefficient into the second preset backbone model, to iteratively optimize the first network parameters, so that the predictions of the second preset backbone model, the third preset backbone model and the preset head network model becomes more and more accurate, and the first target loss function becomes smaller and smaller until the first target loss function converges, and the second target preset backbone model, the third target preset backbone model and the target preset head network model that have been trained are obtained. That is, the second preset backbone model, the third preset backbone model, and the preset head network model can be optimized using the stochastic gradient descent algorithm according to the first target loss function, and repeated multiple times until the first target loss function converges, i.e., the loss function converges, and the target preset head network model that has been trained is obtained.

In block 207, the computer device outputs the first target identity feature by inputting the first target identity coefficient into the second target preset backbone model, outputs the first target texture feature by inputting the first target texture coefficient into the third target preset backbone model, obtains the first target feature by splicing the first target image feature, the first target identity feature, and the first target texture feature, and outputs the expression coefficient by inputting the first target feature into the target preset head network model.

Among them, the computer device can input the first target identity coefficient into the second target preset backbone model and output the accurate first target identity feature, input the first target texture coefficient into the third target preset backbone model and output the accurate first target texture feature, splice the first target image feature, the first target identity feature and the first target texture feature and obtain the first target feature.

Further, input the first target feature corresponding to the first target image feature into the target preset head network model that has been trained to output the accurate first target expression coefficient. Due to the introduction of additional constraint of the prior identity coefficient and the prior texture coefficient, use the prior information provided by past video frames, which is more suitable for use in video scenes, and can further improve the accuracy of output the first target expression coefficient.

In block 208, the computer device uses the first target identity coefficient to replace the second identity coefficient corresponding to the first target image feature in the face image of the current frame in the target video, and uses the first target texture coefficient to replace the second texture coefficient corresponding to the first target image feature in the face image of the current frame in the target video.

Among them, please continue to refer to formula (1) and formula (2), the computer device uses the first target identity coefficient $\hat{d}_{prior}$ to replace the second identity coefficient of the current frame and uses the first target texture coefficient $\hat{t}_{prior}$ to replace the second texture coefficient of the current frame, which is set as a basis of obtaining the identity coefficient and the texture coefficient of the previous frame. By analogy, as the processing of the frames of the video proceeds, the first target identity coefficient and the first target texture coefficient of the face image of each frame starting from the second frame can be combined with the previous prior knowledge and continuously updated.

As can be seen from the above, the embodiment of the present application obtains the target video; inputs the face image of each frame into the first target preset backbone model, and outputs the first target image feature; obtains the first target identity coefficient and the first target texture coefficient of the face image corresponding to the first target image feature in each of other frames of the target video; inputs the first target identity coefficient into the second target preset backbone model and outputs the first target identity feature; inputs the first target texture coefficient into the third target preset backbone model and outputs the first target texture feature; splice the first target image feature, the first target identity feature and the first target texture feature to obtain the first target feature; inputs the first target feature into the target preset head network model, and outputs the first target expression coefficient. The embodiment of the present application combines the prior knowledge in the target video to predict the expression coefficient, compared with the solution of directly extracting the expression coefficient through the 3DMM method, the embodiment of the present application greatly improves the accuracy of the expression coefficient that is extracted.

Figure 5:
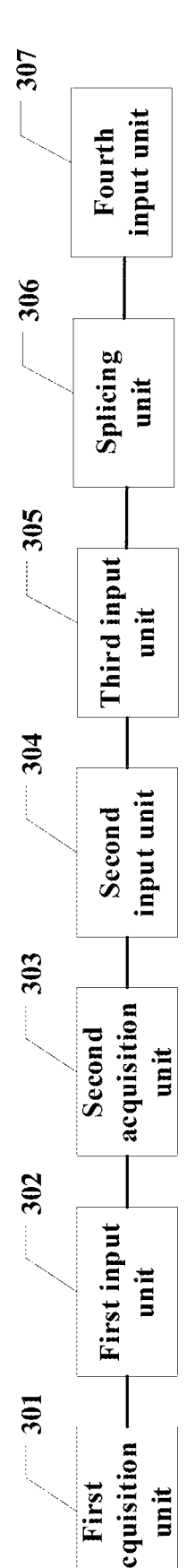
FIG. 5 is a schematic diagram of a structural of an information processing device provided by an embodiment of the present application.

Please refer to FIG. 5, FIG. 5 is a schematic diagram of a structural of an information processing device provided by one embodiment of the present application. The information processing device may include a first acquisition unit 301, a first input unit 302, a second acquisition unit 303, a second input unit 304, a third input unit 305, a splicing unit 306 and a fourth input unit 307.

The first acquisition unit 301 is used to acquire a target video, each frame in the target video includes a face image corresponding to the same object.

In some embodiments, the first acquisition unit 301 includes:

An acquisition subunit, is used to acquire an initial video;

An extraction subunit, is used to extract the face image of each frame in the initial video;

A first determination subunit, is used to determine one or more video segments from the initial video, each of the one or more video segments includes at least two frames and the same object appears in each of the at least two frames;

A second determination subunit, is used to determine one of the one or more video segments with a number of frames greater than a preset threshold as a target video segment.

In some embodiments, the second determination subunit is used to:

Determine the one of the one or more video segments with the number of frames greater than the preset threshold as a first target video segment;

Obtain a second target video segment by performing a style transformation on the first target video segment;

Determine each of the first target video segment and the second target video segment as the target video.

The first input unit 302, is used to input the face image of each frame into the first target preset backbone model and correspondingly output the first target image feature.

The second acquisition unit 303, is used to acquire the first target identity coefficient and the first target texture coefficient, the first target identity coefficient is the identity coefficient of the face image corresponding to the first target image feature in the different frame of the target video, the first target texture coefficient is the texture coefficient of the face image corresponding to the first target image feature in the different frame of the target video, and the first target identity coefficient and the first target texture coefficient are taken from the face image of the same frame.

In some embodiments, the second acquisition unit 303 is used to:

Obtain the first identity coefficient and the first texture coefficient of the face image corresponding to the first target image feature in the previous frame of the target video;

Obtain the second identity coefficient and the second texture coefficient corresponding to the first target image feature;

Obtain the first target identity coefficient corresponding to the first target image feature by performing a weighted summation on the first identity coefficient and the second identity coefficient;

Obtain the first target texture coefficient corresponding to the first target image feature by performing a weighted summation on the first texture coefficient and the second texture coefficient;

The information processing device also includes an update unit, used to:

Use the first target identity coefficient to replace the second identity coefficient corresponding to the first target image feature in the face image of the current frame in the target video;

Use the first target texture coefficient to replace the second texture coefficient corresponding to the first target image feature in the face image of the current frame in the target video.

In some embodiments, the device further includes a first training unit, including:

A first generation subunit, is used to generate the first target loss function;

A first training subunit, is used to iteratively optimize the first network parameters of the second preset backbone model, the third preset backbone model, and the preset head network model separately according to the first target loss function, until the first target loss function converges, and the second target preset backbone model, the third target preset backbone model, and the target preset head network model that have been trained are obtained;

The first generation subunit, is used to input the first target identity coefficient into the second preset backbone model and output the first identity feature;

Input the first target texture coefficient into the third preset backbone model and output the first texture feature;

Splice the first target image feature, the first identity feature, and the first texture feature, and obtain the first feature;

Input the first feature into the preset head network model and output the first predicted expression coefficient;

Generate the first predicted face three-dimensional model based on the label identity coefficient, the label texture coefficient, the first predicted expression coefficient, the label posture coefficient, and the label lighting coefficient;

Obtain the first difference between the first face estimated value corresponding to the first predicted face three-dimensional model and the unoccluded area in the face image;

Obtain the second difference between the first predicted face three-dimensional key points corresponding to the first predicted face three-dimensional model and the face three-dimensional key points;

Establish the first target loss function based on the first difference and the second difference.

The second input unit 304 is used to input the first target identity coefficient into the second target preset backbone model and output the first target identity feature.

The third input unit 305 is used to input the first target texture coefficient into the third target preset backbone model and output the first target texture feature.

The splicing unit 306 is used to splice the first target image feature, the first target identity feature, and the first target texture feature to obtain the first target feature.

The fourth input unit 307 is used to input the first target feature into the target preset head network model and output the first target expression coefficient, among them, the target preset head network model is obtained by performing the prediction optimization training combining the prior identity coefficient and the prior texture coefficient corresponding to the face image of the different frame in the target video.

The specific embodiment of each of the above units may be referred to the previous embodiments and will not be described again here.

Figure 6:
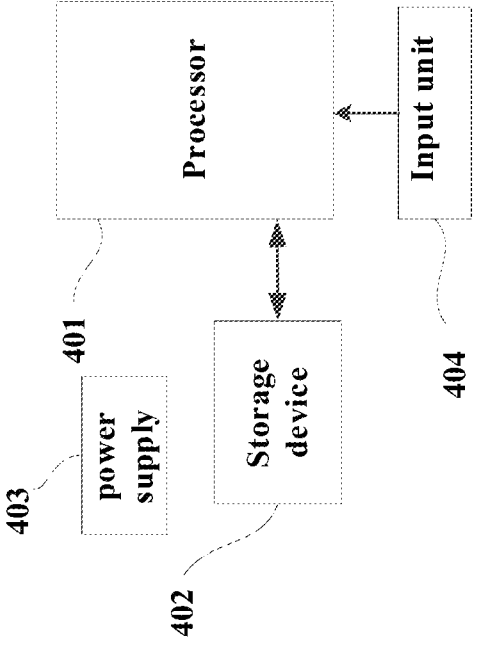
FIG. 6 is a schematic diagram of a structural of a computer device provided by an embodiment of the present application.

Embodiments of the present application also provides a computer device, as shown in FIG. 6, which shows a schematic diagram of a structure of the computer device involved in the embodiment of the present application, specifically:

The computer device may include components such as a processor 401 including one or more processing cores, a storage device 402 of one or more computer-readable storage medium, a power supply 403, and an input unit 404. Those skilled in the art can understand that the structure of the computer device shown in FIG. 6 does not constitute a limitation on the computer device, and may include more or fewer components than shown in the figure, or combine certain components, or arrange different components. Among them:

The processor 401 is a control center of the computer device, using various interfaces and lines to connect various parts of the entire computer device, by running or executing software programs and/or modules stored in the storage device 402, and calling data stored in the storage device 402, perform various functions of the computer device and process the data to conduct overall monitoring of the computer device. Optionally, the processor 401 may include one or more processing cores; optionally, the processor 401 may integrate an application processor and a modem processor, among them, the application processor mainly processes the operating system, user interface and application programs, etc., the modem processor mainly processes wireless communications. It can be understood that the above modem processor may not be integrated into the processor 401.

The storage device 402 can be used to store software programs and modules, and the processor 401 executes various functional applications and information processing by running the software programs and modules stored in the storage device 402. The storage device 402 may mainly include a storage program area and a storage data area, among them, the storage program area may store an operating system, an application program required for at least one function (such as a sound playback function, an image playback function, etc.), etc.; the storage data area may store data created according to the use of the computer device, etc. In addition, the storage device 402 may include a high-speed random access memory, and may also include a non-volatile storage device, such as at least one magnetic disk storage device, flash memory device, or other volatile solid-state storage device. Accordingly, the storage device 402 may also include a storage device controller to provide the processor 401 with access to the storage device 402.

The computer device also includes a power supply 403 that supplies power to various components. Optionally, the power supply 403 can be logically connected to the processor 401 through a power management system, thereby realizing functions such as charging, discharging, and power consumption management through the power management system. The power supply 403 may also include one or more direct current or alternating current power supplies, recharging systems, power failure detection circuits, power converters or inverters, power status indicators, and other arbitrary components.

The computer device may further include an input unit 404 that may be used to receive numeric or character information that is input and generate signals of keyboard, mouse, joystick, optical, or trackball related to user settings and functional controls.

Although not shown, the computer device may further include a display unit and the like, which will not be described again here. Specifically, in this embodiment, the processor 401 in the computer device can load executable files corresponding to processes of one or more application programs into the storage device 402 according to following instructions, and the processor 401 can run the application program stored in the storage device 402, and implement various method blocks provided by the foregoing embodiments, as follows:

Obtain the target video, each frame of the target video including the face image corresponding to the same object; input the face image of each frame into the first target preset backbone model, and output the first target image feature; obtain the first target identity coefficient and the first target texture coefficient, the first target identity coefficient is the identity coefficient of the face image corresponding to the first target image feature in the different frame of the target video, the first target texture coefficient is the texture coefficient of the face image corresponding to the first target image feature in the different frame of the target video, the first target identity coefficient and the first target texture coefficient are taken from the face image of the same frame; input the first target identity coefficient into the second target preset backbone model and output the first target identity feature; input the first target texture coefficient into the third target preset backbone model and output the first target texture feature; splice the first target image feature, the first target identity feature, and the first target texture feature, and obtain the first target feature; input the first target feature into the target preset head network model, and output the first target expression coefficient, among them, the target preset head network model is obtained by performing the prediction optimization training combining the prior identity coefficient and the prior texture coefficient corresponding to the face image of the different frame in the target video.

In the above embodiments, each embodiment is described with its own emphasis. For those that are not described in detail in a certain embodiment, please refer to the detailed description of the information processing method above and will not be described again here.

The ordinary skilled in the art can understand that all or part of the blocks in the various methods of the above embodiments can be completed by instructions, or by controlling relevant hardware through instructions. The instructions can be stored in a computer-readable storage medium, and loaded and executed by the processor.

In this respect, embodiments of the present application provide a computer-readable storage medium in which a plurality of instructions are stored, and the instructions can be loaded by the processor to execute the blocks in any information processing method provided by the embodiments of the present application. For example, the instructions can perform the following blocks:

Obtain the target video, each frame of the target video including the face image corresponding to the same object; input the face image of each frame into the first target preset backbone model, and output the first target image feature; obtain the first target identity coefficient and the first target texture coefficient, the first target identity coefficient is the identity coefficient of the face image corresponding to the first target image feature in the different frame of the target video, the first target texture coefficient is the texture coefficient of the face image corresponding to the first target image feature in the different frame of the target video, the first target identity coefficient and the first target texture coefficient are taken from the face image of the same frame; input the first target identity coefficient into the second target preset backbone model and output the first target identity feature; input the first target texture coefficient into the third target preset backbone model and output the first target texture feature; splice the first target image feature, the first target identity feature, and the first target texture feature, and obtain the first target feature; input the first target feature into the target preset head network model, and output the first target expression coefficient, among them, the target preset head network model is obtained by performing the prediction optimization training combining the prior identity coefficient and the prior texture coefficient corresponding to the face image in the different frame of the target video.

According to one aspect of the present application, a computer program product or a computer program is provided, the computer program product or computer program includes computer instructions stored in a computer-readable storage medium. The processor of the computer device reads the computer instructions from the computer-readable storage medium, and the processor executes the computer instructions, so that the computer device performs the methods provided in the various optional implementations provided by the above embodiments.

For the specific implementation of each of the above operations, please refer to the previous embodiments and will not be described again here.

The computer-readable storage medium may include: read only memory (ROM), random access memory (RAM), magnetic disk or optical disk, etc.

Since the instructions stored in the computer-readable storage medium can execute the blocks in any information processing method provided by the embodiments of this application, therefore, any of the information processing method provided by the embodiments of this application can be implemented. The beneficial effects that can be achieved are detailed in the previous embodiments and will not be described again here.

The information processing method, the device, the computer device and the storage medium provided by the embodiments of the present application have been introduced in detail. This article uses specific examples to illustrate the principles and implementation methods of the present application. The description of the above embodiments is only used to help understand the methods and core ideas of this application; at the same time, for those skilled in the art, there will be changes in the specific implementation and the application scope based on the ideas of the present application. In summary, the contents of the specification should not be construed as limitations on this application.

What is claimed is:

1. An information processing method, comprising:
obtaining a target video comprising a plurality of frames, each of the plurality of frames comprising a face image corresponding to a same object;
obtaining a first target image feature corresponding to the face image of each frame;
determining a first target identity coefficient and a first target texture coefficient;
determining a first target identity feature based on the first target identity coefficient;
determining a first target texture feature based on the first target texture coefficient;
splicing the first target image feature, the first target identity feature, and the first target texture feature, and obtaining a first target feature; and
determining a first target expression coefficient based on the first target feature.

2. The information processing method according to claim 1, wherein determining the first target identity coefficient and the first target texture coefficient comprises:
obtaining a first identity coefficient and a first texture coefficient of the face image corresponding to the first target image feature in a previous frame of the target video;
obtaining a second identity coefficient and a second texture coefficient corresponding to the first target image feature;
performing a weighted summation on the first identity coefficient and the second identity coefficient, and obtaining the first target identity coefficient corresponding to the first target image feature;
performing the weighted summation on the first texture coefficient and the second texture coefficient, and obtaining the first target texture coefficient corresponding to the first target image feature.

3. The information processing method according to claim 2, wherein after determining the first target expression coefficient, the method further comprises:
using the first target identity coefficient to replace the second identity coefficient corresponding to the first target image feature in the face image of a current frame in the target video;
using the first target texture coefficient to replace the second texture coefficient corresponding to the first target image feature in the face image of the current frame in the target video.

4. The information processing method according to claim 3, wherein obtaining the target video comprises:
acquiring an initial video;
extracting the face image of each frame in the initial video;
determining the same object by analyzing the face image of each frame, and determining one or more video segments from the initial video, each of the one or more video segments comprising at least two frames and the same object comprised in each of the at least two frames;
determining one of the one or more video segments with a number of frames greater than a preset threshold as the target video.

5. The information processing method according to claim 4, wherein determining one of the one or more video segments with the number of frames greater than the preset threshold as the target video comprises:
determining the one of the one or more video segments with the number of frames greater than the preset threshold as a first target video segment;
obtaining a second target video segment by performing a style transformation on the first target video segment; and
determining each of the first target video segment and the second target video segment as the target video.

6. The information processing method according to claim 5, wherein after determining the first target identity coefficient and the first target texture coefficient, further comprises:

generating a first target loss function, comprising:

inputting the first target identity coefficient into a second preset backbone model, and outputting a first identity feature;

inputting the first target texture coefficient into a third preset backbone model, and outputting a first texture feature;

splicing the first target image feature, the first identity feature, and the first texture feature, and obtaining a first feature;

inputting the first feature into a preset head network model, and outputting a first predicted expression coefficient;

generating a first predicted face three-dimensional model according to a label identity coefficient, a label texture coefficient, the first predicted expression coefficient, a label posture coefficient, and a label lighting coefficient;

obtaining a first difference between a first face estimated value corresponding to the first predicted face three-dimensional model and an un-occluded area in the face image;

obtaining a second difference between first predicted face three-dimensional key points corresponding to the first predicted face three-dimensional model and face three-dimensional key points in the face image; and establishing the first target loss function based on the first difference and the second difference.

7. The information processing method according to claim 6, further comprising:

performing an optimization on a first network parameters of the second preset backbone model, the third preset backbone model, and the preset head network model according to the first target loss function;

returning to repeatedly generate the first target loss function, iteratively optimizing the first network parameters of the second preset backbone model, the third preset backbone model, and the preset head network model through the first target loss function that is generated, until the first target loss function converges, and obtaining a second target preset backbone model, a third target preset backbone model, and a target preset head network model that have been trained.

8. A computer device comprising:

a storage device;

at least one processor; and the storage device storing one or more programs, which when executed by the at least one processor, cause the at least one processor to:

obtain a target video comprising a plurality of frames, each of the plurality of frames comprising a face image corresponding to a same object;

obtain a first target image feature corresponding to the face image of each frame;

determine a first target identity coefficient and a first target texture coefficient;

determine a first target identity feature based on the first target identity coefficient;

determine a first target texture feature based on the first target texture coefficient;

splice the first target image feature, the first target identity feature, and the first target texture feature, and obtain a first target feature; and determine a first target expression coefficient based on the first target feature.

9. The computer device according to claim 8, wherein the at least one processor determines the first target identity coefficient and the first target texture coefficient by:

obtaining a first identity coefficient and a first texture coefficient of the face image corresponding to the first target image feature in a previous frame of the target video;

obtaining a second identity coefficient and a second texture coefficient corresponding to the first target image feature;

performing a weighted summation on the first identity coefficient and the second identity coefficient, and obtaining the first target identity coefficient corresponding to the first target image feature;

performing the weighted summation on the first texture coefficient and the second texture coefficient, and obtaining the first target texture coefficient corresponding to the first target image feature.

10. The computer device according to claim 9, wherein after determining the first target expression coefficient, the at least one processor is further caused to:

use the first target identity coefficient to replace the second identity coefficient corresponding to the first target image feature in the face image of a current frame in the target video;

use the first target texture coefficient to replace the second texture coefficient corresponding to the first target image feature in the face image of the current frame in the target video.

11. The computer device according to claim 10, wherein the at least one processor obtains the target video by:

acquiring an initial video;

extracting the face image of each frame in the initial video;

determining the same object by analyzing the face image of each frame, and determining one or more video segments from the initial video, each of the one or more video segments comprising at least two frames and the same object comprised in each of the at least two frames;

determining one of the one or more video segments with a number of frames greater than a preset threshold as the target video.

12. The computer device according to claim 11, wherein the at least one processor determines one of the one or more video segments with the number of frames greater than the preset threshold as the target video by:

determining the one of the one or more video segments with the number of frames greater than the preset threshold as a first target video segment;

obtaining a second target video segment by performing a style transformation on the first target video segment; and determining each of the first target video segment and the second target video segment as the target video.

13. The computer device according to claim 12, wherein after determining the first target identity coefficient and the first target texture coefficient, the at least one processor is further caused to:

generate a first target loss function, comprising:

input the first target identity coefficient into a second preset backbone model, and output a first identity feature;

input the first target texture coefficient into a third preset backbone model, and output a first texture feature;

splice the first target image feature, the first identity feature, and the first texture feature, and obtain a first feature;

input the first feature into a preset head network model, and output a first predicted expression coefficient;

generate a first predicted face three-dimensional model according to a label identity coefficient, a label texture coefficient, the first predicted expression coefficient, a label posture coefficient, and a label lighting coefficient;

obtain a first difference between a first face estimated value corresponding to the first predicted face three-dimensional model and an un-occluded area in the face image;

obtain a second difference between first predicted face three-dimensional key points corresponding to the first predicted face three-dimensional model and face three-dimensional key points in the face image; and establish the first target loss function based on the first difference and the second difference.

14. The computer device according to claim 13, the at least one processor is further caused to:

perform an optimization on a first network parameters of the second preset backbone model, the third preset backbone model, and the preset head network model according to the first target loss function;

return to repeatedly generate the first target loss function, iteratively optimizing the first network parameters of the second preset backbone model, the third preset backbone model, and the preset head network model through the first target loss function that is generated, until the first target loss function converges, and obtaining a second target preset backbone model, a third target preset backbone model, and a target preset head network model that have been trained.

15. A non-transitory storage medium having instructions stored thereon, when the instructions are executed by a processor of a computer device, the processor is caused to perform an information processing method, wherein the method comprises:

obtaining a target video comprising a plurality of frames, each of the plurality of frames comprising a face image corresponding to a same object;

obtaining a first target image feature corresponding to the face image of each frame;

determining a first target identity coefficient and a first target texture coefficient;

determining a first target identity feature based on the first target identity coefficient;

determining a first target texture feature based on the first target texture coefficient;

splicing the first target image feature, the first target identity feature, and the first target texture feature, and obtaining a first target feature; and determining a first target expression coefficient based on the first target feature.

16. The non-transitory storage medium according to claim 15, wherein determining the first target identity coefficient and the first target texture coefficient comprises:

obtaining a first identity coefficient and a first texture coefficient of the face image corresponding to the first target image feature in a previous frame of the target video;

obtaining a second identity coefficient and a second texture coefficient corresponding to the first target image feature;

performing a weighted summation on the first identity coefficient and the second identity coefficient, and obtaining the first target identity coefficient corresponding to the first target image feature;

performing the weighted summation on the first texture coefficient and the second texture coefficient, and obtaining the first target texture coefficient corresponding to the first target image feature.

17. The non-transitory storage medium according to claim 16, wherein after determining the first target expression coefficient, the method further comprises:

using the first target identity coefficient to replace the second identity coefficient corresponding to the first target image feature in the face image of a current frame in the target video;

using the first target texture coefficient to replace the second texture coefficient corresponding to the first target image feature in the face image of the current frame in the target video.

18. The non-transitory storage medium according to claim 17, wherein obtaining the target video comprises:

acquiring an initial video;

extracting the face image of each frame in the initial video;

determining the same object by analyzing the face image of each frame, and determining one or more video segments from the initial video, each of the one or more video segments comprising at least two frames and the same object comprised in each of the at least two frames;

determining one of the one or more video segments with a number of frames greater than a preset threshold as the target video.

19. The non-transitory storage medium according to claim 18, wherein determining one of the one or more video segments with the number of frames greater than the preset threshold as the target video comprises:

determining the one of the one or more video segments with the number of frames greater than the preset threshold as a first target video segment;

obtaining a second target video segment by performing a style transformation on the first target video segment; and determining each of the first target video segment and the second target video segment as the target video.

20. The non-transitory storage medium according to claim 19, wherein after determining the first target identity coefficient and the first target texture coefficient, the method further comprises:

generating a first target loss function, comprising:

inputting the first target identity coefficient into a second preset backbone model, and outputting a first identity feature;

inputting the first target texture coefficient into a third preset backbone model, and outputting a first texture feature;

splicing the first target image feature, the first identity feature, and the first texture feature, and obtaining a first feature;

inputting the first feature into a preset head network model, and outputting a first predicted expression coefficient;

generating a first predicted face three-dimensional model according to a label identity coefficient, a label texture coefficient, the first predicted expression coefficient, a label posture coefficient, and a label lighting coefficient;

obtaining a first difference between a first face estimated value corresponding to the first predicted face three-dimensional model and an un-occluded area in the face image;

obtaining a second difference between first predicted face three-dimensional key points corresponding to the first predicted face three-dimensional model and face three-dimensional key points in the face image; and establishing the first target loss function based on the first difference and the second difference.

* * * * *